US012730974B2

(12) United States Patent
Kondapi et al.

(10) Patent No.: US 12,730,974 B2
(45) Date of Patent: Sep. 8, 2026

(54) SYSTEM AND METHOD FOR MANAGING CAPABILITY INTENT ACTION POLICIES FOR CAPABILITIES ASSOCIATED WITH ARTIFICIAL INTELLIGENCE PRODUCTIVITY TOOL RESPONSES BASED ON FEEDBACK SENTIMENT DATA

(71) Applicant: Dell Products LP, Round Rock, TX (US)

(72) Inventors: Srikanth Kondapi, Austin, TX (US); Daniel L. Hamlin, Round Rock, TX (US); Balasingh P. Samuel, Round Rock, TX (US)

(73) Assignee: DELL PRODUCTS LP, Round Rock, TX (US)

(*) Notice: Subject to any disclaimer, the term of this patent is extended or adjusted under 35 U.S.C. 154(b) by 149 days.

(21) Appl. No.: 18/904,461

(22) Filed: Oct. 2, 2024

(65) Prior Publication Data

US 2026/0093923 A1 Apr. 2, 2026

(51) Int. Cl.
*G06F 40/00* (2020.01)
*G06F 40/30* (2020.01)

(52) U.S. Cl.
CPC .................................... *G06F 40/30* (2020.01)

(58) Field of Classification Search
CPC ...... G06F 40/30; G06F 16/3344; G06F 40/35; G06F 16/243; G06F 16/90332;
(Continued)

(56) References Cited

U.S. PATENT DOCUMENTS 8,380,714 B2 2/2013 Inagaki
8,548,951 B2 10/2013 Solmer
(Continued)

FOREIGN PATENT DOCUMENTS

WO 2020/192587 A1 10/2020
WO 2021/050382 A1 3/2021
WO 2023/249666 A1 12/2023

OTHER PUBLICATIONS

N. Gamal, S. Ghoniemy, H. M. Faheem and N. A. Seada, "Sentiment-Based Spatiotemporal Prediction Framework for Pandemic Outbreaks Awareness Using Social Networks Data Classification," in IEEE Access, vol. 10, pp. 76434-76469, 2022. (Year: 2022).*

*Primary Examiner* — Edgar X Guerra-Erazo
(74) *Attorney, Agent, or Firm* — Prol Intellectual Property Law, PLLC; H. Kenneth Prol

(57) ABSTRACT

An information handling system includes a hardware processor to execute computer-readable program code instructions of an AI productivity tool software module to process an initial user query input received from a user and correlate the user query input to a capability intent action and to initiate the capability intent action to respond to the user query input, and execute a sentiment analysis software application to analyze a subsequent user query input and generate feedback sentiment data describing a positive or negative sentiment of the subsequent user query input in a generated transaction log including the initial user query input, the responsive capability intent action, the subsequent user query input and a feedback sentiment score of the subsequent use query input that is transmitted to a remote policy management server for an intent technology decision maker to generate capability intent action policies based on the feedback sentiment data.

20 Claims, 4 Drawing Sheets

(58) Field of Classification Search
CPC .......... G06F 40/284; G06N 3/08; G06N 3/02; G06N 3/042; G06N 3/043; G06N 3/044; G06N 3/0442; G06N 3/0455; G06N 3/045; G06N 3/0464; G06N 3/0475; G06N 3/092; G06N 3/094; G06N 3/096; G06N 3/098; G06N 20/10; G06N 20/20; G06N 20/00; G10L 15/00; G10L 15/01; G10L 15/06; G10L 15/063; G10L 15/065; G10L 15/07; G10L 15/075; G10L 15/16; G10L 15/183
See application file for complete search history.

(56) References Cited

U.S. PATENT DOCUMENTS 9,201,957 B2 12/2015 Turdakov
9,218,412 B2 12/2015 Wang
9,626,358 B2 4/2017 Danielyan
9,633,085 B2 4/2017 Kamotsky
9,648,683 B2 5/2017 Kangyo
10,146,593 B2 12/2018 Gong
11,379,654 B2 * 7/2022 Waters .................. G06F 40/166
11,620,262 B2 4/2023 Lee
11,935,532 B2 * 3/2024 Yannam .................. G10L 15/16
11,948,073 B2 4/2024 Zhang
2018/0365065 A1 12/2018 Guttman
2020/0034432 A1 * 1/2020 Jain ...................... G06N 3/0475
2020/0387550 A1 12/2020 Cappetta
2020/0394360 A1 12/2020 Dunn
2021/0216576 A1 7/2021 Staub
2021/0256207 A1 8/2021 Dunn
2021/0334194 A1 10/2021 Xiao
2021/0366506 A1 11/2021 Han
2021/0374353 A1 12/2021 Zhang
2022/0035684 A1 2/2022 Gupte
2022/0035732 A1 2/2022 Xiao
2022/0092439 A1 3/2022 Liu
2022/0253777 A1 * 8/2022 Gupta ................ G06Q 30/0282
2022/0318502 A1 10/2022 Howell
2023/0105806 A1 4/2023 Dunn
2023/0106639 A1 * 4/2023 Wagener .................. G06N 3/04 726/1
2023/0222359 A1 7/2023 Panikkar
2023/0237263 A1 7/2023 Howell
2023/0251962 A1 8/2023 Xiao
2023/0267374 A1 8/2023 Polleri
2023/0336340 A1 10/2023 Polleri
2023/0377238 A1 * 11/2023 Hutton .................. G06F 40/284
2023/0409277 A1 12/2023 Sharifi
2024/0007414 A1 1/2024 Jain
2024/0037346 A1 2/2024 Chorakhalikar
2024/0054318 A1 2/2024 Feltin
2024/0061719 A1 2/2024 Reddy
2024/0069770 A1 2/2024 Prabhakar
2024/0069959 A1 2/2024 Prabhakar
2024/0070113 A1 2/2024 Prabhakar
2024/0161003 A1 5/2024 Alexander

* cited by examiner

SYSTEM AND METHOD FOR MANAGING CAPABILITY INTENT ACTION POLICIES FOR CAPABILITIES ASSOCIATED WITH ARTIFICIAL INTELLIGENCE PRODUCTIVITY TOOL RESPONSES BASED ON FEEDBACK SENTIMENT DATA

FIELD OF THE DISCLOSURE

The present disclosure generally relates to execution of computer-readable program code instructions for one or more artificial intelligence (AI) productivity tools generating responsive actions to user query inputs. The present disclosure more specifically relates systems and methods of implementing capability intent action policies and changing the capability intent action policies based on direct or indirect feedback sentiment data in an information handling system for managing the capabilities of one or more AI productivity tool-enablable software applications executable on an information handling system.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. The information handling system may be used to execute instructions of one or more workspace productivity applications or other application such as for teleconferencing, word processing, sales systems, business software, gaming applications, or the like. Further, the information handling system may include an on the box (OTB) artificial intelligence (AI) productivity tool employing machine learning (ML) models stored locally at the information handling system, as installed by a manufacturer of the information handling system, for optimizing user productivity and information handling system performance.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
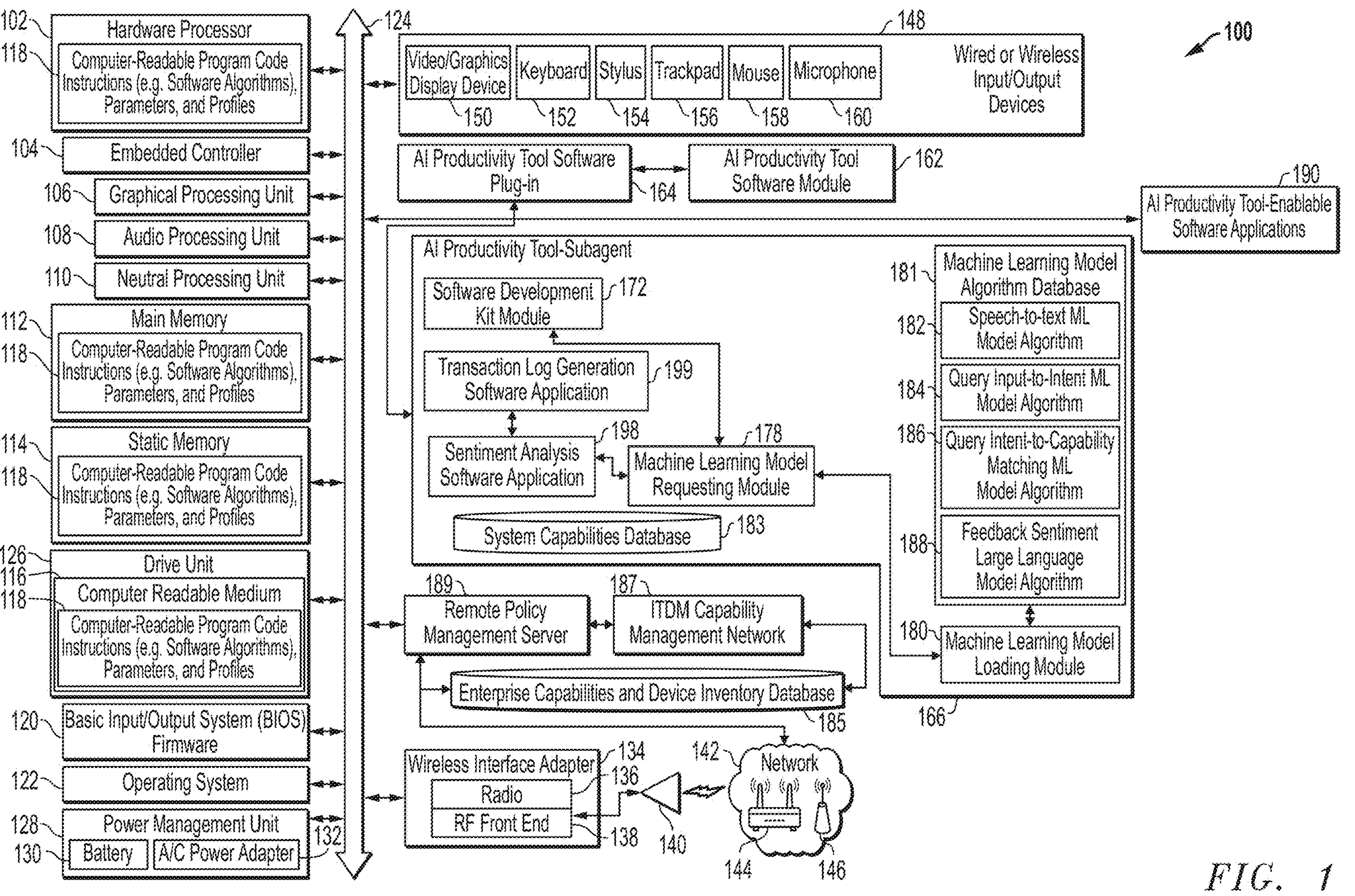
FIG. 1 is a block diagram illustrating an information handling system that includes computer-readable program code instructions of an AI productivity tool software module to identify and select responsive software services, operations, or other capabilities of a plurality of AI productivity tool-enablable software applications and to gather direct or indirect feedback sentiment data used to modify one or more capability intent action policies according to an embodiment of the present disclosure.

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Information handling systems, including computers, mobile computers, and smart phones are increasingly employing artificial intelligence (AI) productivity tools to optimize user productivity and performance of the information handling systems. Examples of such artificial intelligence methodologies includes chatbots to simulate conversations between the information handling system and the user. In an example embodiment of the present disclosure, an AI productivity tool may be used to trigger changes in firmware or hardware (e.g., changing display or power settings), software, or processes of one or more other AI productivity tool-enablable software applications (e.g., send an e-mail or text message, schedule a meeting). Various machine learning models may be used to support such functionality, including automatic speech recognition (ASR) models, text embedding models, and similarity search models that may work in combination with one another to identify a responsive capability intent action that may be taken by an AI productivity tool enablable software application as requested within a received user query input according to embodiments herein. For example, an existing AI productivity tool may be capable of determining a user's intent in a query intent value from a user query input for correlation to a capability intent action having a capability intent value via lexical or semantic similarity matching of that determined query intent value with a capability intent value. Such capabilities of AI productivity tool-enablable software applications are accessible based on published or established capabilities by a particular of one or more AI productivity tool-enablable software applications executing at the information handling system stored in system capabilities database. In some embodiments, once the AI productivity tool-enablable software application capable of performing the responsive capability to the user query input is identified, the AI productivity tools may identify an application programming interface (API) call that, when executed, may cause the AI productivity tool-enablable software application associated with the identified responsive capability to perform that responsive capability intent action.

Prior to such a process and prior to a user providing such a user query input into computer readable code instructions executing an AI productivity tool, each of a plurality of AI productivity tool-enablable software applications have an application programming interface (API) and may register with the existing AI productivity tool a list of application capabilities achievable by that AI productivity tool-enablable software application for storage in a system capabilities database. In some embodiments, that list of application capabilities includes a list or library of API calls associated with each of those application capabilities that the AI productivity tools can use to cause the AI productivity tool-enablable software applications to execute identified responsive application capability intent actions in responding to user query inputs.

An internet technology decision maker (ITDM) of a managed information handling system for an enterprise, however, may need controls over some or all aspects of behaviors related to the performance of the individual information handling systems within the enterprise including execution of responsive capability intent action pursuant to user query inputs by an AI productivity tool in embodiments herein. This is extended to those operations of the individual information handling systems that include the AI productivity tools and AI productivity tool-enablable software applications that are operated to provide the responsive capability intent actions, software services, or other responses to a user query input. In embodiments, the ITDM may further need to identify those capabilities associated with each of the AI productivity tools and AI productivity tool-enablable software applications that are operated pursuant to a user's user query input that fail to accurately detect the user's intent. In embodiments herein, the ITDM may be provided with direct and indirect feedback sentiment data at an ITDM capability management network executing at a remote policy management server for managing enterprise client information handling systems. The reported direct and indirect feedback sentiment data provided to the ITDM determined to be positive or negative feedback data may be used to tune or alter capability intent action policies associated with the capabilities that, when altered, increase the effectiveness of the capabilities executed by the AI productivity tools and AI productivity tool-enablable software applications. The direct or indirect feedback sentiment data is used to determine the semantic tone of the feedback gathered from the user in later, additional user query inputs as direct feedback sentiment data or from transaction logs of user-instigated actions in software, firmware or hardware as indirect feedback sentiment data after execution of a responsive capability intent action to a first user query input in embodiments herein.

The present specification describes systems and methods of implementing capability intent action policies in an information handling system among a plurality of enterprise-managed information handling systems. In an example embodiment, an information handling system may include a hardware processor with the hardware processor executing computer-readable program code instructions of an AI productivity tool software module being executed on the information handling system to, via execution of an AI productivity tool subagent, invoke a machine learning (ML) model algorithm to process a user query input received from a user and correlate the user query input to a responsive capability intent action. As described herein, the capability intent actions are the result of an AI productivity tool and/or AI productivity tool-enablable software application receiving user query input from a user in an attempt to invoke responsive capability intent actions such as hardware component adjustments, software services, or other responses. The selection or semantic similarity matching correlation for responsive capabilities of any of the AI productivity tool-enablable software applications and AI productivity tool software modules or their execution may be affected by the capability intent action policies that had previously been created by the ITDM or presented as default capability intent action policies and transmitted to the individual information handling systems within the enterprise.

In an embodiment, the hardware processor may execute computer-readable program code instructions of a sentiment analysis software application to analyze the user query input and generate direct and indirect feedback sentiment data based on an executed capability intent action, subsequent user query input of the user after the initial user query input, such as attempts to undo an executed capability intent action, and transaction logs of user-initiated software, hardware, or firmware actions after the responsive capability intent action is executed, such as those user-instigated actions to undo the responsive capability intent action. In an embodiment, the direct feedback sentiment data may be received directly from the subsequent user query input when the user query input is accessible or provided to the sentiment analysis software application. In another embodiment, the indirect feedback sentiment data may be derived from subsequently-executed capability intent actions, user-instigated actions in triggering software or altering hardware or firmware settings, or and the initiation of any negated actions by the user to the executed responsive capability intent action that would undo those previously executed capability intent actions responsive to the initial user query input.

In an embodiment, the hardware processor may execute computer-readable program code instructions of a transaction log generation software application to generate a transaction log of the capability intent action correlated with the initial user query input, the capability intent action initiated by the AI productivity tool-enablable software application, and the direct or indirect feedback sentiment data determined to be positive or negative sentiment feedback to the identification of the responsive capability intent action. The execution of computer readable code instructions of the sentiment analysis software application determines whether subsequent user query inputs or subsequent user-instigated actions in software, hardware, or firmware are scored as a positive or negative sentiment to the action of the AI productivity tool determining the responsive capability intent action in response to the received user query input. This transaction log generated may then be transmitted to a remote policy management server for the ITDM to generate capability intent action policies based on the direct or indirect feedback sentiment data to adjust operation of the AI productivity tool or AI productivity tool-enablable software applications by either removing the capability as an option or adjusting the capability intent values for the capability relative to semantic or lexical matching to query intent values in embodiments herein.

Turning now to the figures, FIG. 1 illustrates an information handling system 100 similar to the information handling systems according to several aspects of the present disclosure. In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP) 144, a base station transceiver 146, a wireless telephone, a control system, a camera, a scanner, a printer, a personal trusted device, a web appliance, or any other suitable machine capable of executing a set of instructions (sequential or otherwise) that specify capability intent actions to be taken by that machine, and may vary in size, shape, performance, price, and functionality.

In a networked deployment, the information handling system 100 may operate in the capacity of a client computer in a server-client network environment, or as a peer computer system in a peer-to-peer (or distributed) network environment. In an embodiment, the information handling system 100 may be implemented using electronic devices that provide voice, video, or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or plural sets, of instructions to perform one or more computer functions.

The information handling system 100 may include main memory 112, (volatile (e.g., random-access memory, etc.), or static memory 114, nonvolatile (read-only memory, flash memory etc.) or any combination thereof), one or more hardware processing resources, such as a hardware processor 102 that may be a central processing unit (CPU), embedded controller (EC) 104, a graphics processing unit (GPU) 106, a neural processing unit (NPU) 110, an accelerated processing unit (APU) 108, other types of hardware processing devices, or any combination thereof. It is appreciated that the information handling system 100 may include any number of hardware processing devices described herein. Computer readable code instructions stored in main memory 112 (e.g., RAM) may be "hot" or quickly accessible by hardware processing resources using that main memory 112. Computer-readable program code instructions stored in static memory 114, main memory 112, or drive unit 126 may be "cold" and latency may be involved in invoking such computer-readable program code instructions to main memory 112 according to embodiments herein. Additional components of the information handling system 100 may include one or more storage devices such as static memory 114 or drive unit 126. The information handling system 100 may include or interface with one or more communications ports for communicating with external devices, as well as various input and output (I/O) devices 148, such as a mouse 158, a trackpad 156, a stylus 154, a keyboard 152, a video/graphics display device 150, a microphone 160, or any combination thereof. Portions of an information handling system 100 may themselves be considered information handling systems 100.

Information handling system 100 may include devices or modules that embody one or more of the devices or execute instructions for one or more systems and modules. The information handling system 100 may execute instructions (e.g., software algorithms), parameters, and profiles 118 that may operate on servers or systems, remote data centers, or on-box in individual client information handling systems according to various embodiments herein. In some embodiments, it is understood any or all portions of instructions (e.g., software algorithms), parameters, and profiles 118 may operate on a plurality of information handling systems 100.

The information handling system 100 may include the hardware processor 102 such as a central processing unit (CPU) or other hardware processing resources. Any of the hardware processing resources may operate to execute code that is either firmware or software code. Moreover, the information handling system 100 may include memory such as main memory 112, static memory 114, and disk drive unit 126 (volatile (e.g., random-access memory, etc.), nonvolatile memory (read-only memory, flash memory etc.) or any combination thereof or other memory with computer readable medium 118 storing instructions (e.g., software algorithms), parameters, and profiles 118 executable by the hardware processor 102 (e.g., central processing unit), NPU 110, APU 108, EC 104, GPU 106, or any other hardware processing device. The information handling system 100 may also include one or more buses 124 operable to transmit communications between the various hardware components such as any combination of various I/O devices 148 as well as between hardware processors 102, an EC 104, the operating system (OS) 122, the basic input/output system (BIOS) 120, the wireless interface adapter 134, a wired network interface device, or a radio module, among other components described herein. In an embodiment, the hardware processor 102, EC 104, GPU 106, NPU 110, APU 108, and/or others may execute one or more bus drivers in order to transmit this data between the information handling system 100 and the input/output devices 148 described herein. In an embodiment, the information handling system 100 may be in wired or wireless communication with the I/O devices 148 such a keyboard 152, a mouse 158, video/graphics display device 150, stylus 154, trackpad 156, microphone 160, among other peripheral devices.

As described herein, the information handling system 100 further includes a video/graphics display device 150. The video/graphics display device 150 in an embodiment may function as a liquid crystal display (LCD), an organic light emitting diode (OLED), a flat panel display, or a solid-state display. It is appreciated that the video/graphics display device 150 may be wired or wireless and may be an external video/graphics display device 150 that allows a user to increase the desktop area by extending the desktop in an embodiment. Additionally, as described herein, the information handling system 100 may include or be operatively coupled to a cursor control device (e.g., a trackpad 156, or gesture or touch screen input), a stylus 154, and/or a keyboard 152, among others that allows the user to interface with the information handling system 100 via the video/graphics display device 150. Information handling system 100 may also be operatively coupled to a wired or wireless input/output device 148 or other hardware devices that may include a hardware processing device such as a hardware processor, microcontroller, or other hardware processing resource. Various drivers and hardware control device electronics may be operatively coupled to operate the I/O devices 148 according to the embodiments described herein. The present specification contemplates that the I/O devices 148 may be wired or wireless.

A network interface device of the information handling system 100 may be wired or wireless such as shown with wireless interface adapter 134 or a wired network interface device (not shown) that can provide wireless connectivity among devices such as with Bluetooth® or to a network 142, e.g., a wide area network (WAN), a local area network (LAN), wireless local area network (WLAN), a wireless personal area network (WPAN), a wireless wide area network (WWAN), or other network. In embodiments described herein, the wireless interface adapter 134 with its radio 136, RF front end 138 and antenna 140 is used to communicate with the wireless peripheral devices, via, for example, a Bluetooth® or Bluetooth® Low Energy (BLE) protocols or any proprietary RF protocol such as those may utilize similar frequency ranges but proprietary modulation and data transmission characteristics. In embodiments, Bluetooth®, BLE, proprietary RF protocol, or other WPAN or WLAN protocols and plural such protocols may be used for communication with and among any wireless peripheral device to be paired or paired with the information handling system 100 or other information handling systems.

In other embodiments, a WAN, WWAN, LAN, and WLAN may each include an AP 144 or base station 146 used to operatively couple the information handling system 100 to a network 142 via a wireless interface adapter 134 or a wired network interface device. In a specific embodiment, the network 142 may include macro-cellular connections via one or more base stations 146 or a wireless AP 144 (e.g., Wi-Fi), or such as through licensed or unlicensed WWAN small cell base stations 146. Connectivity may be via wired or wireless connection. For example, wireless network wireless APs 144 or base stations 146 may be operatively connected to the information handling system 100. Wireless interface adapter 134 may include one or more RF (RF) subsystems (e.g., radio 136) with transmitter/receiver circuitry, modem circuitry, one or more antenna RF (RF) front end circuits 138, one or more wireless controller circuits, amplifiers, antennas 140 and other circuitry of the radio 136 such as one or more antenna ports used for wireless communications via multiple radio access technologies (RATs). The radio 136 may communicate with one or more wireless technology protocols.

In an embodiment, the wireless interface adapter 134 may operate in accordance with any wireless data communication standards. To communicate with a wireless local area network, standards including IEEE 802.11 WLAN standards (e.g., IEEE 802.11ax-2021 (Wi-Fi 6E, 6 GHZ)), IEEE 802.15 WPAN standards, WWAN such as 3GPP or 3GPP2, Bluetooth® standards, proprietary RF protocol, or similar wireless standards may be used. Wireless interface adapter 134 may connect to any combination of macro-cellular wireless connections including 2G, 2.5G, 3G, 4G, 5G or the like from one or more service providers. Utilization of RF communication bands according to several example embodiments of the present disclosure may include bands used with the WLAN standards and WWAN carriers which may operate in both licensed and unlicensed spectrums. The wireless interface adapter 134 or network interface device can represent an add-in card, wireless network interface module that is integrated with a main board of the information handling system 100 or integrated with another wireless network interface capability, or any combination thereof. In some embodiments, the wireless interface adapter 134 may also have wired capability of a wired network interface device.

In some embodiments, a hardware processing resource executes computer-readable program code instructions of software or firmware to implement one or more of some systems and methods described herein, or dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware devices with related control and data signals that may be communicated between and through the modules, or as portions of an application-specific integrated circuit. Accordingly, the present system encompasses a hardware processing resource executing computer-readable program code instructions of software or firmware as well as hardware implementations or any combination.

In accordance with various embodiments of the present disclosure, the methods described herein may be implemented by firmware or software programs executable by a hardware controller or a hardware processor system. Further, in an exemplary, non-limited embodiment, implementations may include distributed hardware processing, component/object distributed hardware processing, and parallel hardware processing. Alternatively, virtual computer system processing may be constructed to implement one or more of the methods or functionalities as described herein.

The present disclosure contemplates a computer-readable medium that includes computer-readable program code instructions, parameters, and profiles 118 or receives and executes computer-readable program code instructions, parameters, and profiles 118 responsive to a propagated signal, so that a hardware device connected to a network 134 may communicate voice, video, or data over the network 142. Further, the computer-readable program code instructions, parameters, and profiles 118 may be transmitted or received over the network 142 via the network interface device or wireless interface adapter 134.

The information handling system 100 may include a set of computer-readable program code instructions, parameters, and profiles 118 that may be executed to cause the computer system to perform any one or more of the methods or computer-based functions disclosed herein. For example, computer-readable program code instructions, parameters, and profiles 118 may be executed by a hardware processor 102, GPU 106, EC 104, APU 108, NPU 110, or any other hardware processing resource and may include software agents, or other aspects or components used to execute the methods and systems described herein. Various software modules comprising application computer-readable program code instructions, parameters, and profiles 118 may be coordinated by an OS 122, and/or via an application programming interface (API). An example OS 122 may include Windows®, Android®, and other OS types. Example APIs may include Win 32, Core Java API, or Android APIs.

In an embodiment, the information handling system 100 may include a disk drive unit 126. The disk drive unit 126 and may include machine-readable program code instructions, parameters, and profiles 118 in which one or more sets of machine-readable program code instructions, parameters, and profiles 118 such as firmware or software can be embedded to be executed by the hardware processor 102 (e.g., CPU) or other hardware processing devices such as a GPU 106, an EC 104, an NPU 110, an APU 108, or other hardware processing resource device to perform the processes described herein. Similarly, main memory 112 and static memory 114 may also contain a computer-readable medium for storage of one or more sets of machine-readable program code instructions, parameters, or profiles 118 described herein. The disk drive unit 126 or static memory 114 also contain space for data storage. Further, the machine-readable program code instructions, parameters, and profiles 118 may embody one or more of the methods as described herein. In a particular embodiment, the machine-readable program code instructions, parameters, and profiles 118 may reside completely, or at least partially, within the main memory 112, the static memory 114, and/or within the disk drive 126 during execution by the hardware processor 102, EC 104, APU 108, NPU 110, or GPU 106 of information handling system 100.

Main memory 112 or other memory of the embodiments described herein may contain computer-readable medium (not shown), such as RAM in an example embodiment. An example of main memory 112 includes random access memory (RAM) such as static RAM (SRAM), dynamic RAM (DRAM), non-volatile RAM (NV-RAM), or the like, read only memory (ROM), another type of memory, or a combination thereof. Static memory 114 may contain computer-readable medium (not shown), such as NOR or NAND flash memory in some example embodiments. The applications and associated APIs, for example, may be stored in static memory 114 or on the disk drive unit 126 that may include access to a machine-readable code instructions, parameters, and profiles 118 such as a magnetic disk or flash memory in an example embodiment. While the computer-readable medium is shown to be a single medium, the term "computer-readable medium" includes a single medium or multiple media, such as a centralized or distributed database, and/or associated caches and servers that store one or more sets of machine-readable code instructions. The term "computer-readable medium" shall also include any medium that is capable of storing, encoding, or carrying a set of machine-readable code instructions for execution by a processor or that cause a computer system to perform any one or more of the methods or operations disclosed herein.

In an embodiment, the information handling system 100 may further include a power management unit (PMU) 128 (a.k.a. a power supply unit (PSU)). The PMU 128 may include a hardware controller and executable machine-readable code instructions to manage the power provided to the components of the information handling system 100 such as the hardware processor 102 and other hardware components described herein. The PMU 128 may control power to one or more components including the one or more drive units 126, the hardware processor 102 (e.g., CPU), the EC 104, the GPU 106, APU 108, NPU 110, a video/graphic display device 150, or other wired I/O devices 148 such as the mouse 158, the stylus 154, the keyboard 152, and the trackpad 156 and other components that may require power when a power button has been actuated by a user. In an embodiment, the PMU 128 may monitor power levels and be electrically coupled to the information handling system 100 to provide this power. The PMU 128 may be coupled to the bus 124 to provide or receive data or machine-readable code instructions. The PMU 128 may regulate power from a power source such as the battery 130 or AC power adapter 132. In an embodiment, the battery 130 may be charged via the AC power adapter 132 and provide power to the components of the information handling system 100, via wired connections as applicable, or when AC power from the AC power adapter 132 is removed.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium 110 can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or machine-readable code instructions may be stored.

In other embodiments, dedicated hardware implementations such as application specific integrated circuits (ASICs), programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses hardware resources executing software or firmware, as well as hardware implementations.

As described in embodiments herein, the information handling system 100 includes an AI productivity tool software module 162 and an AI productivity tool subagent 166 to select among a plurality of machine learning (ML) model algorithms 182, 184, 186, 188 for use with execution of a plurality of AI productivity tool-enablable software applications 190 according to another embodiment of the present disclosure. As described herein, the AI productivity tool software module 162 and AI productivity tool subagent 166 may be executed by a hardware processor 102 on the information handling system 100 thereby allowing the methods described herein to be carried out on-the-box such that a wired or wireless network connection to a network is not necessary for operation of the method. In another embodiment, some modules, databases, and/or processing resources may be maintained on a remote server such that a wired or wireless network connection can be made with these remote servers and the method may be implemented as described herein.

The AI productivity tool software module 156 may include any artificial intelligence-based productivity tool to assist in interfacing with and execution of one or more AI productivity tool-enablable software applications 190 or inputs and responses from a user of an information handling system 100. The AI productivity tool software module 162 may be loaded on-the-box by a manufacturer in software and may include chatbot features, virtual assistant features, and other artificial intelligence features that allow a user to provide input to the information handling system 100 and, with generative artificial intelligence processing of a user input query, execute one or more capabilities that include hardware operations, functions, software services, or responses using one or more AI productivity tool-enablable software applications 190. Examples of some AI productivity tool software module 162 may include Cortana® by Microsoft®, Copilot® by Microsoft®, Siri® by Apple® Inc., Gemini® by Google AIR, ChatGPT® by OpenAI®, and Amazon Alexa® by Amazon®, among others. It is appreciated that the information handling system 100 may include any proprietary AI productivity tool software module 162 installed by an information handling system 100 manufacturer and used to interface with the information handling system 100 and the operations thereon. In various embodiments, the hardware processor 102 or other alternative hardware processing resources of the information handling system 100 may execute computer-readable program code instructions of the AI productivity tool software module 162 with its AI productivity tool plug-in 164 and monitor for user input for a user query at a microphone 160, keyboard 152, or other input device for the AI productivity tool software module 162 to engage in capability intent actions pursuant to the user query input.

The AI productivity tool software module 162, executing on the hardware processor 102 or other hardware processing resource (e.g., EC 104, GPU 106, APU 108, or NPU 110), may interface with other hardware components and with the AI productivity tool-enablable software applications 190 and one or more ML module algorithms 182, 184, 186, 188 on a ML model algorithm database 181 and with the information handling system 100 via an AI productivity tool plug-in 164. The AI productivity tool plug-in 164 may be any software or firmware that allows the AI productivity tool software module 162 to perform those actions at the information handling system 100 based on user query input (e.g., typed, spoken words, images, etc.) provided from the user. The AI productivity tool plug-in 164 may be used by the AI productivity tool software module 162 and AI productivity tool subagent 166 to interface with any number of AI productivity tool-enablable software applications 190 executing or executable on the information handling system 100 according to embodiments herein.

The information handling system 100 also includes the AI productivity tool subagent 166 of the AI productivity tool software module 162. The AI productivity tool subagent 166 may be any software and/or firmware executable by the hardware processor 102 of the information handling system 100 to interface one or more of the plurality of the AI productivity tool-enablable software applications 190 to provide AI enabled capabilities within those AI productivity tool-enablable software applications 190 for responsive hardware, firmware, or software operations, functions, software services, or responses to user input queries. In an embodiment, the computer-readable program code instructions of the software applications (e.g., AI productivity tool-enablable software applications 190) and modules described herein may operate wholly "on-box" within the information handling system 100 or be subagents on-box for interfacing with remote software systems executing at remote server locations such as the remote policy management server 189 described herein. In an embodiment, the AI productivity tool subagent 166 may be used to direct the execution of various modules in support of the AI productivity tool-enablable software applications 190 described herein. Additionally, the AI productivity tool subagent 166 may be provided with access to the BIOS and OS of the information handling system 100 to conduct the capability intent actions pursuant to the user's query input provided via the AI productivity tool software module 162 or with an interface of one of the AI productivity tool-enablable software applications 190.

In an embodiment, the hardware processor 102 or other hardware processing resource (e.g., EC 104, GPU 106, CPU, APU 108, or NPU 110) executing computer-readable program code instructions of the AI productivity tool subagent 166. The AI productivity tool subagent 166 may engage with a machine learning model requesting module 178 to have one or more ML module algorithms 182, 184, 186, 188 loaded and executed on the hardware processor in order to, initially, determine the query intent value to correlate with a capability intent action to be conducted responsive to the received user query inputs. The execution of the computer-readable program code instructions of the AI productivity tool subagent 166 may call a software development kit (SDK) module 172. The SDK module 172 may include any computer-readable program code instructions that is executed by the hardware processor 102 or other hardware processing resource to request that a ML module algorithm 182, 184, 186, 188 be invoked to support an identification of, in an embodiment, a capability intent action based on received user query inputs from a user. For example, the ML module algorithms 182, 184, 186, 188 may include a query input-to-intent ML model algorithm 184 that receives the user query input, and with an embedding algorithm generates a vectorized query intent value for the user query input for later correlation with a capability intent value.

The ML module algorithms 182, 184, 186, 188 may also include a query intent-to-capability matching ML model algorithm 186 that receives the vectorized query intent value as input and matches the vectorized query intent value to a vectorized capability intent value associated with the AI productivity tool-enablable software application 190 via a similarity correlation algorithm to identify a capability that can serve as the capability intent action responsive to a user query input. It is appreciated that the selected ML module algorithms 182, 184, 186, 188 may be selected such that the query intent value from the user query inputs may be interpreted and an available capability associated with one of the plurality of AI productivity tool-enablable software applications 190 as the capability intent action can be matched to the user's query input. The execution of the computer-readable program code of the AI productivity tool subagent 166 allows a user to interface with the AI productivity tool software module 162 (e.g., via text input, audio input, image input, etc.) and have a responsive action, such as a hardware operation or adjustment, software service, or other response from the information handling system 100 that satisfies the user's user query input.

It is appreciated, however, that not all capability intent actions executed at the information handling system 100 satisfactorily complete the user's query inputs as anticipated by the user. For example, a user may provide, user query input (e.g., via the microphone 160, keyboard 152, mouse 158, etc.) stating "fix audio issues in my system." This may be a result of the user, for example, not appreciating the tone, volume, streaming rate, and other current attributes of the audio output at a speaker associated with the information handling system 100. As such, the AI productivity tool software module 162 receives this user query input and passes it onto the AI productivity tool subagent 166 for identification of a capability intent action that can be carried out. During operation, the AI productivity tool subagent 166 may engage with a machine learning model requesting module 178 and machine learning model loading module 180 in order to process this user query input to identify a capability associated with one or more AI productivity tool-enablable software applications 190 that can execute a corresponding capability intent action to solve the user's perceived audio issues.

For example, the machine learning model loading module 180 may load a speech-to-text model algorithm 182 in order to, where necessary, convert any audio user query input into text or other machine-readable program code instructions for further processing by the AI productivity tool subagent 166. In an embodiment, the speech-to-text model algorithm 182 may include an automatic speech recognition ML model algorithm or other speech recognition ML model algorithm. As described herein, the query input-to-intent ML model algorithm 184 may receive the user query input from the speech-to-text model algorithm 182 or directly from the AI productivity tool subagent 166, and with an embedding algorithm generates a vectorized query intent value for the user query input for later correlation with a capability intent value from a library of available capabilities at a system capabilities database 183. Additionally, the query intent-to-capability matching ML model algorithm 186 receives that vectorized query intent value as input and matches the vectorized query intent value to a vectorized capability intent value associated with the AI productivity tool-enablable software application 190 via a similarity correlation algorithm to identify a capability from the system capabilities database 183 that can serve as the capability intent action responsive to a user query input. In the context of the user query input received from the user (e.g., "fix audio issues in my system") one or more of the AI productivity tool-enablable software applications 190 may be used to adjust the audio at the user's information handling system 100, such as via an audio driver software and peripheral input/output device management software. For example, the Dell® Display and Peripheral Manager® software application, the Dell® Optimizer® software application, audio driver software, or any other AI productivity tool-enablable software application 190 may include a matching capability that can fix the user's audio issues.

It is appreciated, however, those changes in firmware or hardware (e.g., changing audio settings at one or more speakers), software, or processes at the information handling system 100 via the one or more AI productivity tool-enablable software application 190 may not be satisfactory for the user and the audio issues (or other issues associated with the user query input) may still persist. Alternatively, the audio issues may have been fixed and the user may continue with other types of user query input unrelated to the previously-declared audio issues. Whether the original issues had been fixed or not, an ITDM may wish to offer, to the user or other users within an enterprise of information handling systems, augmented capability intent action policies that define how the available capabilities associated with each AI productivity tool-enablable software application 190 can be augmented to improve user satisfaction in the resulting capability intent actions. This may include altering the capability natural language descriptions or altering capability intent values for certain capabilities to either have them better match or less likely match with particular user query intent values in an embodiment. Other augmentations may include removing capabilities, adjusting capabilities, or even adding capabilities to the capabilities library for AI productivity-enablable software applications 190 stored in the system capabilities database 183 accessed by the AI productivity tool software module 162 or available to user query input matching. For example, an ITDM may want to further define how certain capabilities can be modified, augmented, added to, or removed to better fix those issues indicated within collected direct or indirect feedback sentiment data related to responses to an initial user query input in an embodiment. In another example embodiment, the ITDM may wish to provide further information to the user via prompt recommendations on, for example, the videographic display device 150 that described to the user how to better provide user query input to the AI productivity tool software module 162. In another example embodiment, the ITDM may wish to control the specific operations on the information handling system 100 such as which capabilities associated with specific AI productivity tool-enablable software applications 190 should be invoked by operation of the AI productivity tool subagent 162 that better addresses similar user query inputs or to remove capabilities that prove to not be useful for responding to user query inputs.

In order to develop and provide these augmented capability intent action policies, the information handling system 100 includes execution of computer readable code instructions for a sentiment analysis software application 198. The sentiment analysis software application 198 may, in an embodiment, include any computer-readable program code instructions that, when executed by a hardware processor, analyzes the initial user query input as well as any subsequent user query inputs, and generates feedback sentiment data describing a positive or negative sentiment of the progression of one or more subsequent user query inputs. This may be done where the sentiment analysis software application 198 is given access to the subsequent user query inputs as it is received by the AI productivity tool subagent 166 from the AI productivity tool software module 162. In this embodiment, the sentiment analysis software application 198 may be operatively coupled to the machine learning model requesting module 178 and machine learning model loading module 180 to have a feedback sentiment large learning model (LLM) algorithm 188 be invoked to create direct feedback sentiment data that describes the subsequent user query inputs as relative to the initial user input and whether the sentiment is negative, positive, without relevant sentiment, or even whether it is relevant feedback about the initial user query input. For example, the feedback sentiment LLM algorithm 188 may identify emotions of the user as presented in the user query input based on semantic or keyword matching with meaning vectors indicating positive or negative statements. In an embodiment, the invocation of the feedback sentiment LLM algorithm 188 may identify and extract subjective meaning information from text or audio of the subsequent user query input such as the user's opinions, attitudes, appraisals, emotions, and the like in order to determine whether the user's user query input is positive, negative, or neutral. This direct feedback sentiment data may be assigned a sentiment value that, when one or more sentiment value thresholds has been reached, indicates whether the user's user query input is positive, negative, or neutral.

In another example embodiment, the sentiment analysis software application 198 may include any computer-readable program code instructions that, when executed by a hardware processor, generates indirect feedback sentiment data based on a subsequent user-instigated action or subsequent executed capability intent action determined to undo the executed capability intent action responsive to the initial user query input. This may be done, in one example embodiment, where the sentiment analysis software application 198 is not necessarily given access to the initial or subsequent user query inputs, but is provided with data describing which responsive capability intent actions were carried out as well as a history of subsequently executed user-instigated actions or subsequent capability intent actions after the original responsive capability intent action was carried out. In some embodiments, the history of executed user-instigated actions or capability intent actions may even include those occurring before the original responsive capability intent action was carried out as further contextual sentiment information. In other embodiments, the transaction log of user-instigated actions for indirect feedback sentiment data is used in addition to where the sentiment analysis software application 198 is given access to the initial user query input and subsequent user query inputs.

For example, where the capability intent action executed had made changes to the audio settings associated with the speakers, any previous or subsequent capability intent actions executed by an AI productivity tool-enablable software application 190 that undoes the original capability intent action carried out is indicated. This indicated transaction log data for subsequent capability intent actions or user-instigated actions executed by an AI productivity tool-enablable software application 190 or other software applications that undoes the original capability intent action may be treated as the feedback sentiment data and may show that the user was unsatisfied with the changes made to the settings or is otherwise attempting, with user-instigated action to have a setting changed. In other embodiments, a responsive capability intent action may not be available and this may be indicated from information inferred from the transaction logs.

In example embodiments, the sentiment analysis software application 198 may assign sentiment score values associated with the subsequent (or even previous) user-instigated actions or capability intent actions executed to change or alter an original responsive capability intent action. These sentiment score values relate to assignment of negative, neutral, or positive sentiment inferred from the subsequent (or even previous) user-instigated actions or subsequent capability intent actions relative to how close those actions are to directly undoing the previously executed responsive capability intent action. For example, inverse correlation may be used between the subsequent (or even previous) user-instigated actions or capability intent actions and the original, responsive capability intent action in embodiments herein. This may come from capability intent values for the subsequent (or even previous) user-instigated actions or capability intent actions as compared to the original, responsive capability intent action. In some embodiments, a semantic correlation algorithm for inverse correlation may be used and further one or more thresholds that may also be set, for example, to indicate a level of inverse correlation relative to a complete undo action of the original capability intent action. Although specific assignments of score values to this previous or subsequent capability intent actions executed by the AI productivity tool-enablable software applications 190 may be used to determine if the sentiment values have fallen within a threshold of meeting such an inverse correlation criteria for an undo action, it is appreciated that any type of evaluation metric may be made that could suggest that user's subsequent (or even previous) user-instigated actions or capability intent actions have a negative or neutral indirect sentiment. A similar approach may be used with a positive correlation between the subsequent (or even previous) user-instigated actions or capability intent actions and an original capability intent action to determine a positive sentiment. The present specification also contemplates these other evaluation metrics in order to determine if the user's subsequent (or even previous) user-instigated actions or capability intent actions have positive, negative, or neutral sentiment.

After the feedback sentiment data has been generated, the sentiment analysis software application 198 may transmit the sentiment data to a transaction log generation software application 199. Execution of the computer-readable program code of the transaction log generation software application 199 generates a transaction log of the capability intent action correlated with the user query input, the capability intent action initiated by the AI productivity tool-enablable software applications, and the sentiment data generated by the sentiment analysis software application 198. The transaction log generation software application 199 may then transmit this transaction log to a remote policy management server 189 for an intent technology decision maker (ITDM) to generate augmented capability intent action policies based on the sentiment data. In the context of the example embodiment described herein, the ITDM may see that a threshold has been exceed in the sentiment data and may alter whether, when, or how the capability intent action policies are executed at each of the information handling systems 100 within an enterprise or on individual information handling systems 100. For example, the ITDM may access an ITDM capability management network 187 in order to update, change, remove, capabilities or provide prompt recommendations to be associated with any given capability.

In the example presented herein where the user query input was "fix audio issues in my system," the ITDM may determine, in one scenario, that positive direct or indirect feedback sentiment data was presented in subsequent user query inputs or subsequent (or even previous) user-instigated actions or capability intent actions that indicate the user's positive sentiment toward the executed responsive capability intent action to the original user query input. In this scenario, the ITDM may use this positive direct or indirect feedback sentiment data to provide prompt recommendations to be presented to this or other users in the enterprise that describes what user query input from the user would result in a better capability intent action in the future. Where, in another scenario, the sentiment data indicated a negative criteria was presented that indicated that the user's sentiment of the user query input was negative, the ITDM may update the capability intent action policies to remove or alter specific capability intent actions associated with any AI productivity tool-enablable software application. For example, the wherein the user query input was "fix audio issues in my system," the ITDM may update those capability intent action policies that change audio settings to either limit what settings can be changed or completely prevent changes to specific audio settings all together. Additionally, or alternatively, the ITDM may change a mapping of one of those capability intent actions associated with audio settings, by altering capability intent values for those capability intent actions, such that a different capability associated with an AI productivity tool-enablable software application 190 is mapped to change those audio settings when the or similar user query input is received.

Once these updated and/or augmented capability intent action policies have been generated by the ITDM at the ITDM capability management network 187, the ITDM may transmit those augmented capability intent action policies to the information handling system 100 or any number of information handling systems within an enterprise. In an embodiment, the ITDM may, via the ITDM capability management network 187, have access to an enterprise capabilities and device inventory database 185. The enterprise capabilities and device inventory database 185 may include information regarding the hardware, firmware, and software on each information handling system 100 within an enterprise. The enterprise capabilities and device inventory database 185 may also include capabilities associated with each AI productivity tool-enablable software application 190 executable on each of the information handling systems 100 as well as those augmented capability intent action policies associated with those capabilities.

When referred to as a "system," a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The system, device, controller, or module can include hardware processing resources executing software, including firmware embedded at a device, such as an Intel® brand processor, AMD® brand processors, Qualcomm® brand processors, or other processors and chipsets, or other such hardware device capable of operating a relevant software environment of the information handling system. The system, device, controller, or module can also include a combination of the foregoing examples of hardware or hardware executing software or firmware. Note that an information handling system can include an integrated circuit or a board-level product having portions thereof that can also be any combination of hardware and hardware executing software. Devices, modules, hardware resources, or hardware controllers that are in communication with one another need not be in continuous communication with each other, unless expressly specified otherwise. In addition, devices, modules, hardware resources, and hardware controllers that are in communication with one another can communicate directly or indirectly through one or more intermediaries.

Figure 2:
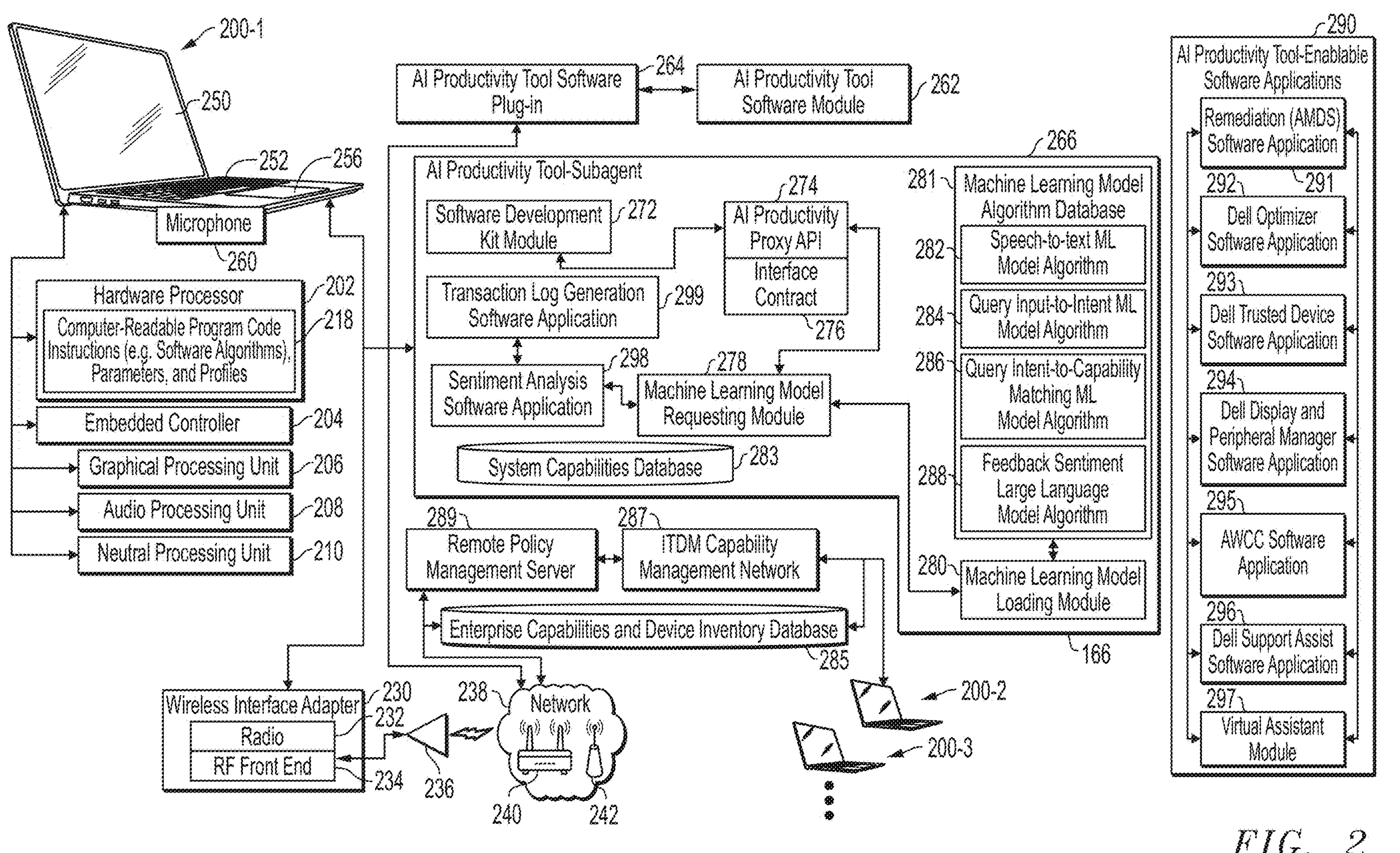
FIG. 2 is a graphic and block diagram illustrating a plurality of information handling systems that includes computer-readable program code instructions of an AI productivity tool software module to identify and select responsive capability intent actions of a plurality of AI productivity tool-enablable software applications and to gather direct or indirect feedback sentiment data used to modify one or more capability intent action policies according to an embodiment of the present disclosure.

FIG. 2 is a graphic and block diagram illustrating a plurality of information handling systems that includes computer-readable program code instructions of an AI productivity tool software module to identify and select responsive capability intent actions of a plurality of AI productivity tool-enablable software applications and to gather direct or indirect feedback sentiment data used to modify one or more capability intent action policies according to an embodiment of the present disclosure. As described herein, an information handling system 200-1, 200-2, 200-3 may be one of many information handling systems 200-1, 200-2, 200-3 within an enterprise. This enterprise may be monitored by an ITDM that generates capability intent action policies and/or augments those capability intent action policies that are to be executed by the individual AI productivity tool-enablable software applications 290 at one or multiple information handling systems 200-1, 200-2, 200-3.

As described in embodiments herein, the information handling system 100 includes computer-readable program code of an AI productivity tool software module 262 and an AI productivity tool subagent 266 that, when executed by a hardware processor, selects among a plurality of ML model algorithms 282, 284, 286, 288 for use with execution of a plurality of AI productivity tool-enablable software applications 290 according to embodiments of the present disclosure. As described herein, the AI productivity tool software module 262 and AI productivity tool subagent 266 may be executed by a hardware processor 202 on the information handling system 200-1, 200-2, 200-3 thereby allowing the methods described herein to be carried out on-the-box such that a wired or wireless network connection to a network is not necessary for operation of the method. In another embodiment, some modules, databases, and/or processing resources may be maintained on a remote server such that a wired or wireless network connection can be made with these remote servers and the method may be implemented as described herein.

The AI productivity tool software module 262, executing on the hardware processor 202 or other hardware processing resource (e.g., EC 204, GPU 206, APU 208, or NPU 210), may interface with other hardware components and with the AI productivity tool-enablable software applications 290 and one or more ML module algorithms 282, 284, 286, 288 on a ML model algorithm database 281 and with other software applications on the information handling system 200-1, 200-2, 200-3 via an AI productivity tool plug-in 264. The AI productivity tool plug-in 264 may be any software or firmware that allows the AI productivity tool software module 262 to perform those actions at the information handling system 200-1, 200-2, 200-3 based on user query input (e.g., typed, spoken words, images, etc.) provided from the user. The AI productivity tool plug-in 264 may be used by the AI productivity tool software module 262 and AI productivity tool subagent 266 to interface with any number of AI productivity tool-enablable software applications 290 executing or executable on the information handling system 200-1, 200-2, 200-3 according to embodiments herein.

As shown in FIG. 2, a specific user's information handling system 200-1 may be one of a plurality of information handling systems 200-1, 200-2, 200-3 within an enterprise. Each of these information handling systems 200-1, 200-2, 200-3 may include similar devices, hardware, software, and firmware described herein such that any augmented capability intent action policies may be further augmented via execution of the sentiment analysis software application 298, transaction log generation software application 299, and the ITDM capability management network 287 issuing augmented capability intent action policies among other software applications, modules, and hardware described herein. It is appreciated that the systems and methods described herein may propagate augmented capability intent action policies from a remote policy management server 289 executing the ITDM capability management network 287 to any or all of the information handling systems 200-1, 200-2, 200-3 within the enterprise in order to customize the operations of each of the information handling systems 200-1, 200-2, 200-3 with respect to generating responsive capability intent actions to user query inputs.

In an embodiment, each of the information handling systems 200-1, 200-2, 200-3 includes the AI productivity tool subagent 266 of the AI productivity tool software module 262. The AI productivity tool subagent 266 may be any software and/or firmware executable by the hardware processor 202 of the information handling systems 200-1, 200-2, 200-3 to interface one or more of the plurality of the AI productivity tool-enablable software applications 290 (such as a remediation (AMDS) software application 291, Dell® Optimizer® software application 292, Dell® Trusted Device® software application 293, Dell® Display and Peripheral Manager® software application 294, Alienware® Command Center (AWCC) software application 295, Dell® Support Assist® software application 296, virtual assistant module 297) to provide AI enabled capabilities within those AI productivity tool-enablable software applications 290 for responsive hardware, firmware, or software operations, functions, software services, or responses to user input queries. In an embodiment, the computer-readable program code instructions of the software applications (e.g., AI productivity tool-enablable software applications 290) and modules described herein (e.g., 291, 292, 293, 294, 295, 296, 297) may operate wholly "on-box" within the information handling systems 200-1, 200-2, 200-3 or be subagents on-box for interfacing with remote software systems executing at remote server locations such as the remote policy management server 289 described herein. In an embodiment, the AI productivity tool subagent 266 may be used to direct the execution of various modules in support of the AI productivity tool-enablable software applications 290 described herein. Additionally, the AI productivity tool subagent 266 may be provided with access to the BIOS and OS of the information handling system 200-1, 200-2, 200-3 to conduct the capability intent actions pursuant to the user's query input provided via the AI productivity tool software module 262 or with an interface of one of the AI productivity tool-enablable software applications 290.

During operation, the user may provide user query input at the AI productivity tool software module 262. The AI productivity tool software module 262 may transmit this user query input to the AI productivity tool subagent 266 via the AI productivity tool software plugin 264 as described herein. In an embodiment, the AI productivity tool subagent 266 may engage with a machine learning model requesting module 278 to have one or more ML module algorithms 282, 284, 286, 288 loaded by a machine learning model loading module 280 and executed on a hardware processor in order to, initially, determine the query intent value and then to correlate that query intent value or query lexical keywords with a capability intent action to be conducted responsive to the received user query inputs.

As described herein, however, not all of the user's query inputs executed at the information handling system 200-1, 200-2, 200-3 may satisfactorily complete the capability intent actions as anticipated by the user. For example, a user may provide, as user query input (e.g., via the microphone 260, keyboard 252, mouse, touchpad 256, etc.) stating "fix audio issues in my system." This may be a result of the user, for example, not appreciating the tone, volume, streaming rate, and other current attributes of the audio output at a speaker associated with the information handling system 200-1, 200-2, 200-3. As such, the AI productivity tool software module 262 receives this user query input and passes it onto the AI productivity tool subagent 266 via the AI productivity tool software plug-in 264 for identification of a responsive capability intent action or plural responsive capability intent actions that can be carried out. During operation, the AI productivity tool subagent 266 may engage with a machine learning model requesting module 278 and machine learning model loading module 280 in order to process this user query input to identify a capability or capabilities associated with one or more AI productivity tool-enablable software applications 290 that can execute a corresponding capability intent actions to solve the user's perceived audio issues.

For example, the machine learning model loading module 280, pursuant to the interface contract 276 generated by the AI productivity proxy API 274, may load a speech-to-text model algorithm 282 in order to, where necessary, convert any audio user query input into text or other machine-readable program code instructions for further processing by the AI productivity tool subagent 266. In an embodiment, the speech-to-text model algorithm 282 may include an automatic speech recognition ML model algorithm or other speech recognition ML model algorithm. As described herein, the query input-to-intent ML model algorithm 284 may receive the user query input from the speech-to-text model algorithm 282 or directly from the AI productivity tool subagent 266 if received as text, and, with an embedding algorithm, generates a vectorized query intent value for the user query input for later correlation with a capability intent value. Additionally, the query intent-to-capability matching ML model algorithm 286 receives that vectorized query intent value as input and matches the vectorized query intent value to a vectorized capability intent value associated with the AI productivity tool-enablable software application 290 via a similarity correlation algorithm to identify a capability or plurality of capabilities that can serve as one or more capability intent actions responsive to a user query input.

In the context of the user query input received from the user (e.g., "fix audio issues in my system") one or more of the AI productivity tool-enablable software applications 290 may be used to adjust the audio at the user's information handling system 200-1, 200-2, 200-3. For example, the Dell® Display and Peripheral Manager® software application 294, the Dell® Optimizer® software application 292, or any other AI productivity tool-enablable software application 290 may include a matching capability that can fix the user's audio issues. For example, the Dell® Display and Peripheral Manager® software application 294 may include a capability to update drivers associated with the peripheral device that is outputting the audio. In another example, the Dell® Optimizer® software application 292 may include a capability that can adjust settings associated with the peripheral device, such as a speaker, that is outputting the audio. It is appreciated that any other capability associated with one or more other AI productivity tool-enablable software applications 290 may be used to help adjust the user's audio output at a speaker (internal or external) at the user's information handling system information handling system 200-1. It is appreciated that this process may have also been carried out by other users at the other information handling system information handling systems 200-2, 200-3 managed within the enterprise by an ITDM via an ITDM capability network 287.

However, those changes in firmware or hardware (e.g., changing audio settings at one or more speakers), software, or processes at the user's information handling system information handling system 200-1 via the one or more responsive capability intent actions of the one or more AI productivity tool-enablable software applications 290 may not be satisfactory for the user. In the context of the example embodiment described herein the audio issues (or other issues associated with the user query input) as perceived by the user may still persist or a change may be made that was not desired by the user. A user may provide an additional subsequent user query input or may cause user-instigated actions in software, firmware, or hardware to make further adjustments after the one or more responsive capability intent actions have been executed. Alternatively, the audio issues may have been fixed and the user may continue with other types of user query input unrelated to the previously-declared audio issues. Whether the original issues had been fixed or not, an ITDM may wish to offer, to the user or other users within an enterprise of information handling system information handling systems 200-1, 200-2, 200-3, augmented capability intent action policies that define how each of the capabilities associated with each AI productivity tool-enablable software application 290 can be augmented to improve user satisfaction in the resulting capability intent actions produced by execution of the AI productivity tool software modules 262.

For example, an ITDM may want to further define how certain capabilities can be modified or augmented to better fix those issues indicated within the subsequent user query inputs or derived from later user-instigated actions in software, firmware, or hardware. In another example embodiment, the ITDM may wish to provide further information in a graphical user interface (GUI) prompt to the user via prompt recommendations on, for example, the videographic display device 250 that described to the user how to better provide user query input to the AI productivity tool software module 262. In another example embodiment, the ITDM may wish to control the specific operations on the information handling system information handling systems 200-1, 200-2, 200-3 within the enterprise such as which capabilities associated with specific AI productivity tool-enablable software applications 290 should be invoked by operation of the AI productivity tool subagent 262 that better addresses similar user query inputs.

In order to develop and provide these augmented capability intent action policies, the information handling system 200 executed computer readable code instructions of a sentiment analysis software application 298. The sentiment analysis software application 298 may, in an embodiment, include any computer-readable program code instructions that, when executed by a hardware processor, analyzes one or more user query inputs including an original user query input and subsequent user query inputs, and generates direct feedback sentiment data describing a positive or negative sentiment of later user query inputs to responsive capability intent action for the initial user query input. This may be done where the sentiment analysis software application 298 is given access to the initial user query input, as well as subsequent user query inputs received after a responsive capability intent action is executed, as they are received by the AI productivity tool subagent 266 from the AI productivity tool software module 262.

In an embodiment, the sentiment analysis software application 298 may be operatively coupled to the machine learning model requesting module 278 and machine learning model loading module 280 to invoke computer readable code instructions of a feedback sentiment large learning model (LLM) algorithm 288 to generate direct feedback sentiment data that describes with a sentiment score the user's sentiment in subsequent user query inputs to execution of a responsive capability intent action as a negative, positive, or neutral sentiment. For example, the feedback sentiment LLM algorithm 288 may identify emotions of the user as presented in the subsequent user query input or inputs. In an embodiment, the invocation of the feedback sentiment LLM algorithm 288 may identify and extract subjective information from text or audio of the subsequent user query input such as the user's opinions, attitudes, appraisals, emotions, and the like in order to determine whether the user's user query input is positive, negative, or neutral. Various aspects of this direct sentiment data in one or more subsequent user query inputs may be assigned a sentiment score value relative to the initial user query input or determined from a user's language and tone that, when one or more sentiment value thresholds has been reached, indicates whether the user's subsequent user query input relating to the executed responsive capability intent action is positive, negative, or neutral.

For example, the user query input may include vocal inflections that may indicate that the user is frustrated with the audio output in the present example embodiment described herein. Additionally, or alternatively, the user query input may include certain inappropriate or toxic language, such as profane, vulgar, racist, sexist, or otherwise offensive remarks. This too may indicate the frustration of the user and the execution of the feedback sentiment LLM algorithm 288 may use that subsequent user query input to determine the whether the user's sentiment regarding an executed responsive capability intent action responsive to an initial user query input is positive, negative, or neutral. It is also appreciated that neutral words may indicate a neutral opinion, attitude, appraisal, or emotion of the user and may also be used to calculate a sentiment value to be compared to a sentiment value threshold to determine if a positive threshold, a negative threshold, or a neutral threshold of sentiment from the words of the one or more subsequent user query inputs has been met or exceeded. The sentiment analysis software application 298, therefore may use this feedback sentiment LLM algorithm 288 to identify a current feedback sentiment of the user to an execution of a capability intent action by the AI productivity tool software module 262 based on the received subsequent user query input.

In another example embodiment, the sentiment analysis software application 298 may include any computer-readable program code instructions that, when executed by a hardware processor, generates indirect feedback sentiment data based on a subsequent user-instigated action or subsequent executed capability intent action determined to undo the executed capability intent action responsive to the initial user query input. This may be done, in one example embodiment, where the sentiment analysis software application 298 is not necessarily given access to the initial or subsequent user query inputs, but is provided with data describing which responsive capability intent actions were carried out as well as a history of subsequently executed user-instigated actions or subsequent capability intent actions after the original responsive capability intent action was carried out. In some embodiments, the history of executed user-instigated actions or capability intent actions may even include those occurring before the original responsive capability intent action was carried out as further contextual sentiment information. In other embodiments, the transaction log of user-instigated actions for indirect feedback sentiment data is used in addition to where the sentiment analysis software application 298 is given access to the initial user query input and subsequent user query inputs.

For example, where the capability intent action executed had made changes to the audio settings associated with the speakers, any previous or subsequent capability intent actions executed by an AI productivity tool-enablable software application 290 that undoes the original capability intent action carried out is indicated. This indicated transaction log data for subsequent capability intent actions or user-instigated actions executed by an AI productivity tool-enablable software application 290 or other software applications that undoes the original capability intent action may be treated as the feedback sentiment data and may show that the user was unsatisfied with the changes made to the settings or is otherwise attempting, with user-instigated action to have a setting changed. In other embodiments, a responsive capability intent action may not be available and this may be indicated from information inferred from the transaction logs.

In example embodiments, the sentiment analysis software application 298 may assign sentiment score values associated with the subsequent (or even previous) user-instigated actions or capability intent actions executed to change or alter an original responsive capability intent action. These sentiment score values relate to assignment of negative, neutral, or positive sentiment inferred from the subsequent (or even previous) user-instigated actions or subsequent capability intent actions relative to how close those actions are to directly undoing the previously executed responsive capability intent action. For example, inverse correlation may be used between the subsequent (or even previous) user-instigated actions or capability intent actions and the original, responsive capability intent action in embodiments herein. This may come from capability intent values for the subsequent (or even previous) user-instigated actions or capability intent actions as compared to the original, responsive capability intent action. In some embodiments, a semantic correlation algorithm for inverse correlation may be used and further one or more thresholds that may also be set, for example, to indicate a level of inverse correlation relative to a complete undo action of the original capability intent action. Although specific assignments of score values to this previous or subsequent capability intent actions executed by the AI productivity tool-enablable software applications 290 may be used to determine if the sentiment values have fallen within a threshold of meeting such an inverse correlation criteria for an undo action, it is appreciated that any type of evaluation metric may be made that could suggest that user's subsequent (or even previous) user-instigated actions or capability intent actions have a negative or neutral indirect sentiment. A similar approach may be used with a positive correlation between the subsequent (or even previous) user-instigated actions or capability intent actions and an original capability intent action to determine a positive sentiment. The present specification also contemplates these other evaluation metrics in order to determine if the user's subsequent (or even previous) user-instigated actions or capability intent actions have positive, negative, or neutral sentiment.

After the indirect feedback sentiment data has been generated, the sentiment analysis software application 298 may transmit the indirect sentiment data and any direct feedback sentiment data determined from subsequent user query inputs after execution of a responsive capability action to a transaction log generation software application 299. Execution of the computer-readable program code of the transaction log generation software application 299 generates a transaction log of the capability intent action correlated with the user query input, any subsequent user query intents, any subsequent user-instigated actions or subsequent capability intent actions initiated by the AI productivity tool-enablable software applications, and the direct or indirect feedback sentiment data generated by the sentiment analysis software application 298 indicating sentiment of the user relative to executed responsive capability intent actions in response to the initial user query input. The transaction log generation software application 299 may then transmit this transaction log to a remote policy management server 289 for an intent technology decision maker (ITDM) to generate augmented capability intent action policies based on the sentiment data.

In the context of the example embodiment described herein, the ITDM may see that a threshold has been exceeded in the sentiment data indicating a negative sentiment from the user. The ITDM may alter how the capability intent action policies are executed at each of the information handling systems 200 within an enterprise or on individual information handling systems 200-1, 200-2, 200-300 in order to rectify this negative sentiment as identified by the sentiment analysis software application 298. For example, the ITDM may access an ITDM capability management network 287 in order to remove, update, change, or otherwise augment the capability policies that direct how each of the capabilities published for one or more AI productivity tool-enablable software applications 290 are to execute respective capability intent actions within the AI productivity tool module software 262 to better address similar user query input.

In the context of the example embodiment described herein, the capability policies may direct that capabilities and capability intent values for specific settings associated with specific audio peripheral devices be changed a certain way in order to better correlate to and address the user's user query input of "fix audio issues in my system." Still further, the capability policies as augmented by the ITDM (e.g., the augmented capability intent action policies) may direct that certain capabilities of the certain one or more AI productivity tool-enablable software applications 290 not be invoked or are removed from the system capabilities database 283 so that they cannot be executed or otherwise provide no benefit to address the user's user query input of "fix audio issues in my system." Additionally, or alternatively, the ITDM may change a mapping of one of those capability intent actions via alteration of assigned capability intent values associated with capabilities for various audio settings such that a different capability associated with an AI productivity tool-enablable software application 290 is mapped more directly or less directly to correlate to the user query input "fix audio issues in my system" to change those audio settings when that or a similar user query input is received.

For example, execution of computer readable code instructions of the AI productivity tool software module 262 may execute a responsive capability intent action adjusts volume and other audio settings and updates the audio drivers in response to a user query input to "fix audio issues in my system." In a subsequent user query input, a user may request "no, undo volume reduction" or may execute a user-instigated action to adjust the volume setting up after the responsive capability intent actions are executed. Direct or indirect feedback sentiment data may determine that at least one responsive capability intent action to adjust volume is associated with a negative sentiment according to the above execution of the sentiment analysis software application 298 in some embodiments. As a result, the transaction log including the subsequent user query input, subsequent user-instigated action and direct or indirect feedback sentiment data identifying the user's negative sentiment may be transmitted to the ITDM capability management network 287. Accordingly, an ITDM may issue an augmented capability intent action policy to change a vector capability value to the control of audio volume to map this capability intent actions via alteration of assigned capability intent values such that a lower semantic correlation to the user query input, "fix audio issues in my system" will not invoke the volume capability of an AI productivity tool-enablable software application 290 in an embodiment. Further, the ITDM may issue an augmented capability intent action policy to change a vector capability value other audio control capability intent actions via alteration of assigned capability intent values such that a higher semantic correlation to the user query input, "fix audio issues in my system" will invoke a different capability associated with an AI productivity tool-enablable software application 290 instead of a volume adjustment capability in other embodiments.

In other example embodiments, the ITDM may access an ITDM capability management network 287 in order to update, change, or provide prompt recommendations to be associated with any given capability. In the example presented herein where the user query input was "fix audio issues in my system," the ITDM may determine in one scenario that positive criteria was presented in the direct or indirect sentiment data that indicated that the user's sentiment of the executed responsive capability intent action or actions responsive to an initial user query input had a positive sentiment. In this scenario, the ITDM may generate a prompt recommendations similar to the initial user query input to be presented to this and other users that describes what user query input from the user would result in a better capability intent action in the future.

Once these updated and/or augmented capability intent action policies have been generated by the ITDM at the ITDM capability management network 287, the ITDM may transmit those augmented capability intent action policies to the user's information handling system information handling system 200-1 or any number of other information handling systems 200-2, 200-3 within an enterprise. This may propagate the augmented capability intent action policies to any number of information handling system information handling systems 200-1, 200-2, 200-3 so that the ITDM does not have to address multiple instances of a negative, positive, or neutral user query input in the future so that issues with the execution of the AI productivity tool subagent do not need to be addressed multiple times by the ITDM.

In an embodiment, the ITDM may, via the ITDM capability management network 287, have access to an enterprise capabilities and device inventory database 285. The enterprise capabilities and device inventory database 285 may include information regarding the hardware, firmware, and software on each information handling system information handling system 200-1, 200-2, 200-3 within an enterprise. The enterprise capabilities and device inventory database 285 may also include capabilities associated with each AI productivity tool-enablable software application 290 executable on each of the information handling systems information handling system 200-1, 200-2, 200-3 as well as those augmented capability intent action policies associated with those capabilities. The information on the enterprise capabilities and device inventory database 285 allows the augmented capability intent action policies to be propagated to those individual information handling system information handling systems 200-1, 200-2, 200-3 that could benefit from the augmented capability intent action policies created by the ITDM at the ITDM capability management network 287.

The systems and methods described herein, therefore, allows for augmented capability intent action policies to be propagated across one or more information handling system information handling systems 200-1, 200-2, 200-3 based on how each user uses the AI productivity tool software application 262. Indeed, because each user may use different syntax or language with their individual user query input to get certain capability intent actions carried out, the system and methods described herein can address all of these different user query inputs in a similar way thereby using the sentiments of the group of users to help in the capability intent actions carried out by one or more information handling system information handling systems 200-1, 200-2, 200-3. It is appreciated that the systems and methods described herein may be used across all types of information handling system information handling systems 200-1, 200-2, 200-3 operating any type of AI productivity tool software application 262 described herein. The ITDM may more easily generate augmented capability intent action policies for a plurality of information handling system information handling systems 200-1, 200-2, 200-3 within an enterprise so that the ITDM does not need to address the issues with every single information handling system information handling system 200-1, 200-2, 200-3 repeatedly.

Figure 3:
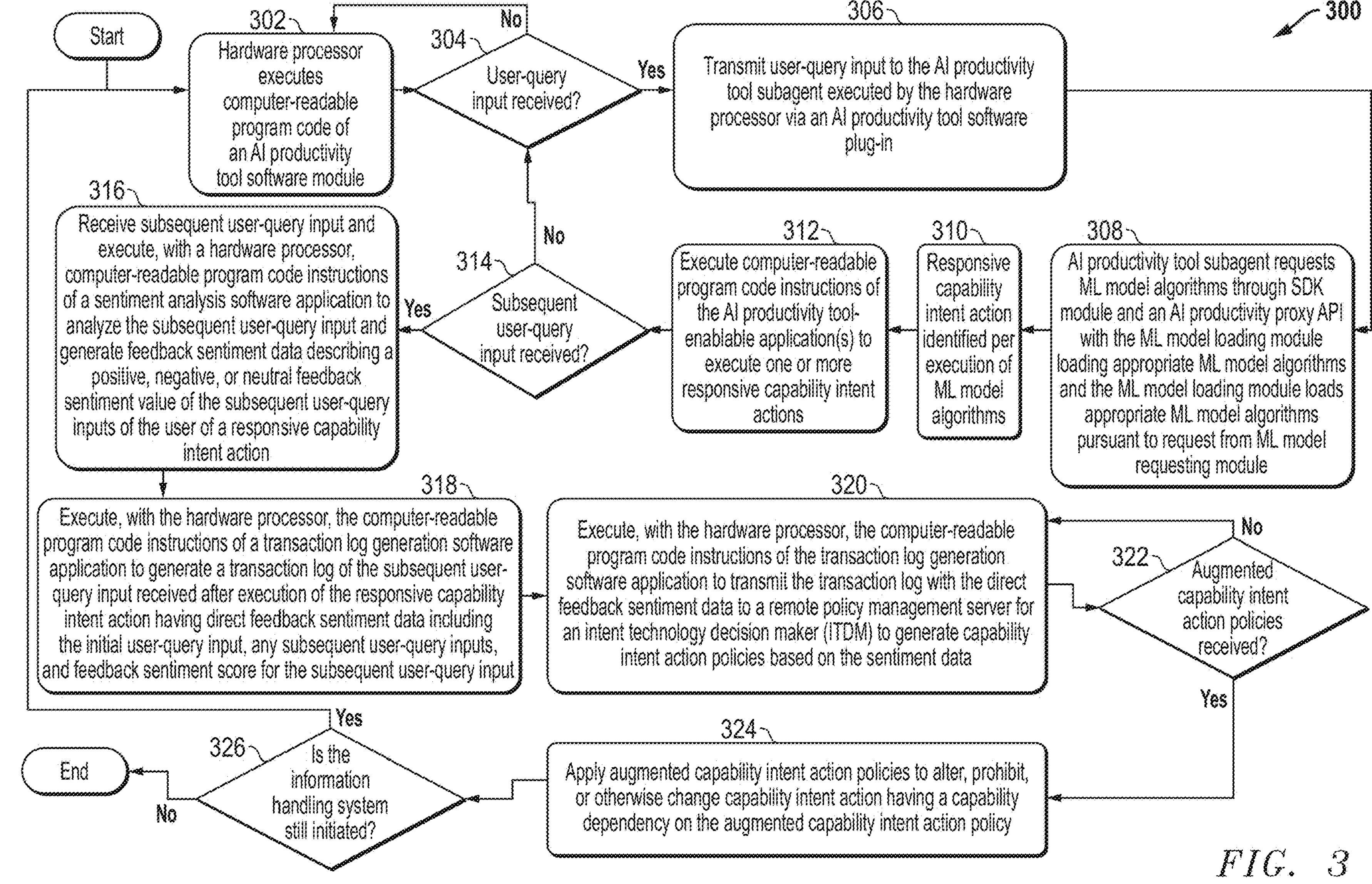
FIG. 3 is a flow diagram showing a method of executing computer-readable program code instructions of an AI productivity tool software module to identify and select responsive capabilities of a plurality of AI productivity tool-enablable software applications and to gather direct or indirect feedback sentiment data used to modify one or more capability intent action policies according to an embodiment of the present disclosure according to an embodiment of the present disclosure.

FIG. 3 is a flow diagram showing a method 300 of executing computer-readable program code instructions of an AI productivity tool software module to identify and select responsive capabilities from a plurality of AI productivity tool-enablable software applications and to gather direct or indirect feedback sentiment data used to modify one or more capability intent action policies according to an embodiment of the present disclosure according to an embodiment of the present disclosure. The method 300 described in connection with FIG. 3 may be operated on an information handling system such as an information handling system (e.g., 100, 200-1, 200-2, 200-3) described in connection with FIG. 1 or 2. In an embodiment, the information handling system may be one of a plurality of information handling systems within an enterprise. In an embodiment, an ITDM may be responsible for generating augmented capability intent action policies for application on these information handling systems within the enterprise to control, modify, and improve operation of the AI productivity tool software modules thereon as described in embodiments herein.

The method 300 may include, at block 302, the hardware processor or other hardware processing device of the information handling system executing computer-readable program code instructions of an AI productivity tool software module including access to one or more AI productivity tool software applications executing on the information handling system. In an embodiment, AI productivity tool software module may be any application that can receive input from a user such as text input via the keyboard or speech input via the microphone. In some embodiments, text or audio may be received by an interface of the one or more AI productivity tool software applications and the interface managed by the AI productivity tool software module at block 302. In an embodiment, the AI productivity tool software module may include a virtual assistant-type AI software agent. In various embodiments, the hardware processor or other alternative hardware processing resources of the information handling system may execute computer-readable program code instructions of the AI productivity tool software application or AI productivity tool software module with its AI productivity tool software plug-in and monitor for user query inputs at a microphone, keyboard, or other input device for the AI productivity tool subagent to engage in capability intent actions pursuant to the user query inputs.

At block 304, the method 300 also includes determining whether any user query input has been received at the AI productivity tool software module. The AI productivity tool plug-in may monitor for input from an input/output device such as a trigger word or trigger keystroke for audio user query inputs or activation of a graphical user interface to receive text user query inputs. Where, at block 304, no user query input is received, the method 300 returns to block 302 with the AI productivity tool software module continuing to monitor for this input. Where, at block 304, the AI productivity tool software module does detect and receive user query input, the method 300 continues to block 306.

At block 306, the user query input is transmitted to a capability intent identification system such as the AI productivity tool subagent and its modules, algorithms, and software applications being executed by the hardware processor of the information handling system. In an embodiment, the AI productivity tool subagent may provide some or all of the AI productivity services as described herein.

At block 308, the method 300 continues with the AI productivity tool subagent requesting ML model algorithm through an SDK module and an AI productivity proxy API. For example, the machine learning model loading module, pursuant to the interface contract generated by the AI productivity proxy API, may load a speech-to-text model algorithm in order to, where necessary, convert any audio user query input into text or other machine-readable program code instructions for further processing by the AI productivity tool subagent. Additional ML model algorithms may be requested as well to generate query intent value for semantic meaning values assigned to the user query input as well as for conducting any semantic or lexical similarity matching with capability intent values to determine responsive capability intent value actions to the user query input in various embodiments herein. The AI productivity proxy API transmits this request for the ML model algorithms to the ML model requesting module. The ML model loading module loads the appropriate ML model algorithms pursuant to the request from the ML model requesting module.

In an embodiment, a speech-to-text model algorithm may be included among the plurality of available ML model algorithms. The speech-to-text model algorithm may, where necessary, convert any audio user query input into text or other machine-readable program code instructions for further processing by the AI productivity tool subagent. The ML model algorithms may also include a query input-to-intent ML model algorithm that receives the user query input from the speech-to-text model algorithm or directly from the AI productivity tool subagent, and, with an embedding algorithm, generates a vectorized query intent value for the user query input for later correlation with a capability intent value. Additionally, a query intent-to-capability matching ML model algorithm may receive that vectorized query intent value as input and match the vectorized query intent value to a vectorized capability intent value associated with the AI productivity tool-enablable software application via a similarity correlation algorithm to identify a capability or plurality of capabilities that can serve as one or more capability intent actions responsive to a user query input.

At block 310, the method 300 includes the capability intent action being identified via the execution of the ML model algorithms identifying the plurality of capabilities associated with one or more of the AI productivity tool-enablable software applications. In the context of the user query input received from the user (e.g., "fix audio issues in my system") one or more of the AI productivity tool-enablable software applications may be used to execute responsive capability intent actions to adjust one or more aspects of the audio at the user's information handling system or to update audio drivers at the information handling system. For example, the Dell® Display and Peripheral Manager® software application, the Dell® Optimizer® software application, or any other AI productivity tool-enablable software application may include a matching capability that can fix the user's audio issues via adjustments to adjust aspects of audio tone, for example bass or treble, adjust audio feed requirements or buffering, adjust volume, or other factors. For example, the Dell® Display and Peripheral Manager® software application may include a capability to update drivers associated with the peripheral device that is outputting the audio. In another example, the Dell® Optimizer® software application may include a capability that can adjust settings associated with the peripheral device that is outputting the audio. It is appreciated that any other capability associated with one or more other AI productivity tool-enablable software applications may be used to help adjust the user's audio output at a speaker (internal or external) at the user's information handling system information handling system. It is appreciated that this process may have also been carried out by other users at the other information handling system information handling systems within the enterprise of information handling system information handling systems.

Proceeding to block 312, the AI productivity tool subagent may issue an instruction for the one or more identified capabilities similarity matched as responsive capability intent actions to be executed by the corresponding AI productivity tool-enablable software application executing on the information handling system. For example, the identified capabilities semantically or lexically similarity matched to the user query input, "fix audio issues in my system" may include the AI productivity tool subagent issuing instructions to a Dell® Display and Peripheral Manager® software application to update drivers associated with the speaker that is outputting the audio. Further, in response to the user query input, "fix audio issues in my system," AI productivity tool subagent may issue instructions to execute responsive capability intent actions to the Dell® Optimizer® software application to include adjustment to audio tone, adjustment to audio feed requirements or buffering, and adjustment to volume in an example embodiment.

At block 314, execution of computer readable code instructions of the AI productivity tool software module, via the AI productivity tool plug-in or via an interface from one of the AI productivity tool-enablable software applications, determines if a subsequent user query input has been received from a user after the execution of one or more responsive capability intent actions as described above. For example, after responsive capability intent actions above have been executed to make adjustments to audio settings or update audio drivers, a user may provide a subsequent user query input, "make volume louder." In another embodiment, the received subsequent user query input may be determined as to whether it pertains or is relevant to the initial user query input or any executed, responsive capability intent actions to that initial user query input. The AI productivity tool subagent may invoke the query intent-to capability matching ML model algorithm in an example embodiment to determine semantic or lexical similarity matching of a subsequent query intent value to the capability intent value of one or more executed responsive capability intent actions that were responsive to the initial user query input in an embodiment. In another embodiment, the semantic similarity matching algorithm may be applied as between the subsequent user query input and the initial user query input to assess for relevance matching. Either or both may be conducted to determine if a received, subsequent user query input is relevant to the executed responsive capability intent actions. For example, the subsequent user query input, "make volume louder" may semantically or lexically match to the initial user query input of "fix audio issues in my system" as well as to executed responsive capability intent actions to adjust audio setting including volume. If a subsequent user query input is determined to have been received by the AI productivity tool software module at block 314, the method may proceed to block 316. In another embodiment, if a subsequent user query input is determined to have been received by the AI productivity tool software module and is determined to be relevant to the responsive capability intent action or actions or to the initial user query input, the method may proceed to block 316. If no subsequent user query input is received at block 314 or the received query input is not relevant to the executed responsive capability intent action or actions, the method may return to block 304 to monitor for additional user query inputs as described above.

At block 316, the method 300 includes executing computer-readable program code of a sentiment analysis software application with a hardware processor to analyze the user query input and a subsequent user query input received after the execution of the responsive capability intent action or actions and generate direct feedback sentiment data describing a positive, negative, or neutral sentiment of the user query input. The sentiment analysis software application may, in an embodiment, include any computer-readable program code instructions that, when executed by a hardware processor, analyzes the user query input, responsive capability intent actions executed, and subsequent user query input or inputs and generates direct feedback sentiment data describing a positive or negative sentiment of the user in the subsequent user query input. This may be done where the sentiment analysis software application is given access to the user query input and subsequent user query inputs as they are received by the AI productivity tool subagent form the AI productivity tool software module as well as the intervening execution of one or more capability intent actions. In this embodiment, the sentiment analysis software application may be operatively coupled to the machine learning model requesting module and machine learning model loading module to have a feedback sentiment large learning model (LLM) algorithm be invoked to create direct feedback sentiment data that scores the user's sentiment in the subsequent user query input as negative, positive, or neutral.

For example, the feedback sentiment LLM algorithm may identify terms and phrases relating to semantic or lexical meaning intent values for emotions of the user as presented in the user query input. In an embodiment, the invocation of the feedback sentiment LLM algorithm may identify and extract subjective information from text or audio of the user query input for semantic or lexical meaning intent values such as the user's opinions, attitudes, appraisals, emotions, and the like in order based on particular words used or phrases used to determine whether the user's subsequent user query input is positive, negative, or neutral relative to the original user query input. For example, a subsequent user query input may include the phrase, "no, make volume louder, darn it!" This direct feedback sentiment data may be assigned a sentiment score value that, when one or more sentiment value thresholds has been reached, indicates whether the user's user query input is positive, negative, or neutral. Factors may include semantic meaning determination indicating a reverse correlation to a responsive capability intent action performed, such as volume louder in response to a capability intent action performed to reduce volume. Further, lexical or semantic meanings may be associated with terms "no" and "darn it" to score the subsequent user query input as more negative or less negative depending on assigned meaning values to those terms for negativity or emotion, respectively, in response to executed responsive capability intent action for an original user query input. In other examples, the subsequent user query input may include vocal inflections or other exclamations that may indicate that the user is frustrated with the audio output after execution of the responsive capability intent actions in the present example embodiment described herein. Additionally, or alternatively, the user query input may include certain inappropriate or toxic language, such as profane, vulgar, or otherwise offensive remarks. This too may indicate the frustration of the user and the execution of the feedback semantic LLM algorithm may use that subsequent user query input to determine a sentiment score for the whether the user's sentiment towards the responsive capability intent action or actions is positive, negative, or neutral. It is also appreciated that neutral words may indicate a neutral opinion, attitude, appraisal, or emotion of the user and may also be used to calculate a sentiment value to be compared to a sentiment value threshold to determine if a positive threshold, a negative threshold, or a neutral threshold has been met or exceeded.

The sentiment scoring may include assessment of the semantic meanings in the subsequent user query input in subsequent query intent values and the level their inverse correlation or inverse matching within a threshold level to capability intent values for one or more executed responsive capability intent actions. For example, the phrase, "increase volume" may be determined to fall within a threshold level of inverse correlation to a capability intent value for a capability intent action that lowers volume in response to "fix audio issues in my system." Further, terms such as "no" in the subsequent user query input may correlate by the feedback sentiment LLM algorithm with a protest against a recently executed capability intent action providing a higher score of negative sentiment. Finally, an exclamation in the subsequent user query input such as "darn it!" may further be associated with frustration by the feedback sentiment LLM algorithm further scoring the subsequent user query input as a negative sentiment such that the sentiment score falls within or above a threshold level sentiment score level for the direct feedback sentiment data. The sentiment analysis software application, therefore, may use this LLM algorithm to identify a current sentiment of the user based on the received subsequent user query input. Although the examples above reflect a negative sentiment assessment, a similar execution of the sentiment analysis software application and the feedback sentiment LLM model algorithm is contemplated for positive sentiment except that a direct correlation may be used and positive emotion statement correlation may be assessed in other embodiments herein.

At block 318, the method 300 further includes executing computer-readable program code of a transaction log generation software application to generate a transaction log including the initial user query input, the responsive capability intent action or actions correlated with the user query input, the subsequent user query input including a feedback sentiment score as the direct feedback sentiment data assessment of the subsequent user query input. In some embodiments, a direct feedback sentiment data score may be required to meet a negative sentiment threshold or a positive sentiment threshold before being included in a transaction log for transmission to an ITDM capability management network.

The transaction log generation software application may then transmit, at block 320, this transaction log to a remote policy management server executing the ITDM capability management network for an enterprise ITDM to generate augmented capability intent action policies based on the direct feedback sentiment data received in the transaction log.

In the context of the example embodiment described herein, the ITDM may see that a threshold has been exceeded in the sentiment data indicating a negative sentiment from the user. The ITDM may alter how the capability intent action policies are executed at each of the information handling systems within an enterprise or on individual information handling systems in order to rectify this negative sentiment as identified by the sentiment analysis software application. For example, the ITDM may access an ITDM capability management network in order to update, change, or otherwise augment the capability policies that direct how each of the one or more AI productivity tool-enablable software applications are to execute respective capability intent actions to better address similar user query input. In the context of the example embodiment described herein, the capability policies may direct that specific settings associated with specific audio peripheral devices be changed a certain way in order to better address the user's user query input of "fix audio issues in my system." Still further, the capability policies as augmented by the ITDM (e.g., the augmented capability intent action policies) may direct that certain capabilities of the certain one or more AI productivity tool-enablable software applications not be invoked so that they cannot undo or otherwise provide no benefit to address the user's user query input of "fix audio issues in my system." Additionally, or alternatively, the ITDM may change a mapping of one of those capability intent actions associated with audio settings such that a different capability associated with an AI productivity tool-enablable software application is mapped to change those audio settings when the or similar user query input is received. For example, the augmented capability policy may be issued to alter the capability intent value of volume adjustments to less likely align with the user query input of "fix audio issues in my system" for this particular user or for users across the enterprise. In other embodiments, a capability for volume adjustment by the AI productivity tool software module may be removed from the system capabilities database in other embodiments for this user or other users. In yet another embodiment, the amount of volume adjustment available pursuant to execution of a responsive capability intent action to a user query input may be limited such as to a percentage adjustment (e.g., limit reduction to up to only 10% or some other limit).

In other example embodiments, the ITDM may access an ITDM capability management network in order to update, change, or provide prompt recommendations to be associated with any given capability. In the example presented herein where the user query input was "fix audio issues in my system," the ITDM may determine in one scenario that positive criteria was presented in the direct feedback sentiment data that indicated that the user's positive sentiment of the responsive capability intent action or actions to the initial user query input. In this scenario, the ITDM may provide prompt recommendations to be presented to this user or other users in the enterprise that describes what user query inputs from the users would result in a better responsive capability intent action in the future.

In an embodiment, the ITDM may, via the ITDM capability management network, have access to an enterprise capabilities and device inventory database. The enterprise capabilities and device inventory database may include information regarding the hardware, firmware, and software on each information handling system information handling system within an enterprise. The enterprise capabilities and device inventory database may also include capabilities associated with each AI productivity tool-enablable software application executable on each of the information handling systems information handling system as well as those augmented capability intent action policies associated with those capabilities. The information on the enterprise capabilities and device inventory database allows the augmented capability intent action policies to be propagated to those individual information handling system information handling systems that could benefit from the augmented capability intent action policies created by the ITDM at the ITDM capability management network.

At block 322, the method 300 determines whether any augmented capability intent action policies have been received from the remote policy management server described herein. Where no augmented capability intent action policies have been received, the method 300 returns back to block 320 with the information handling system waiting until the augmented capability intent action policies are received. It is appreciated that not all transmissions of the transaction logs to the ITDM capability management network via the remote policy management server may result in a response of augmented capability intent action policies. However, the information handling system may execute the computer-readable program code instructions of the transaction log generation software application and AI productivity tool subagent in order to monitor for incoming augmented capability intent action policies from the ITDM as described herein.

At block 322 where any number of augmented capability intent action policies have been received, the method 300 continues to block 324 with the information handling system executing the computer-readable program code of the AI productivity tool subagent of the AI productivity tool software module to apply the augmented capability intent action policies in order to alter, prohibit, or otherwise change capability intent action having a capability dependency on the augmented capability intent action policy.

At block 326, the method 300 further includes determining whether the information handling system is still initiated or not. Where, at block 326, the information handling system is still initiated, the method 300 continues to block 302 with the AI productivity tool software module monitoring for any additional user query input. Where the information handling system is no longer determined to be initiated at block 326, the method may end.

The systems and methods described herein, therefor, allows for augmented capability intent action policies to be propagated across one or more information handling system information handling systems based on how each user uses the AI productivity tool software application. Indeed, because each user may use different syntax or language with their individual user query input to get certain capability intent actions carried out, the system and methods described herein can address all of these different user query inputs in s similar way thereby using the sentiments of the group of users to help in the capability intent actions carried out by one or more information handling system information handling systems. It is appreciated that the systems and methods described herein may be used across all types of information handling system information handling systems operating any type of AI productivity tool software application described herein. The ITDM may more easily generate augmented capability intent action policies for a plurality of information handling system information handling systems within an enterprise so that the ITDM does not need to address the issues with every single information handling system information handling system repeatedly.

Figure 4:
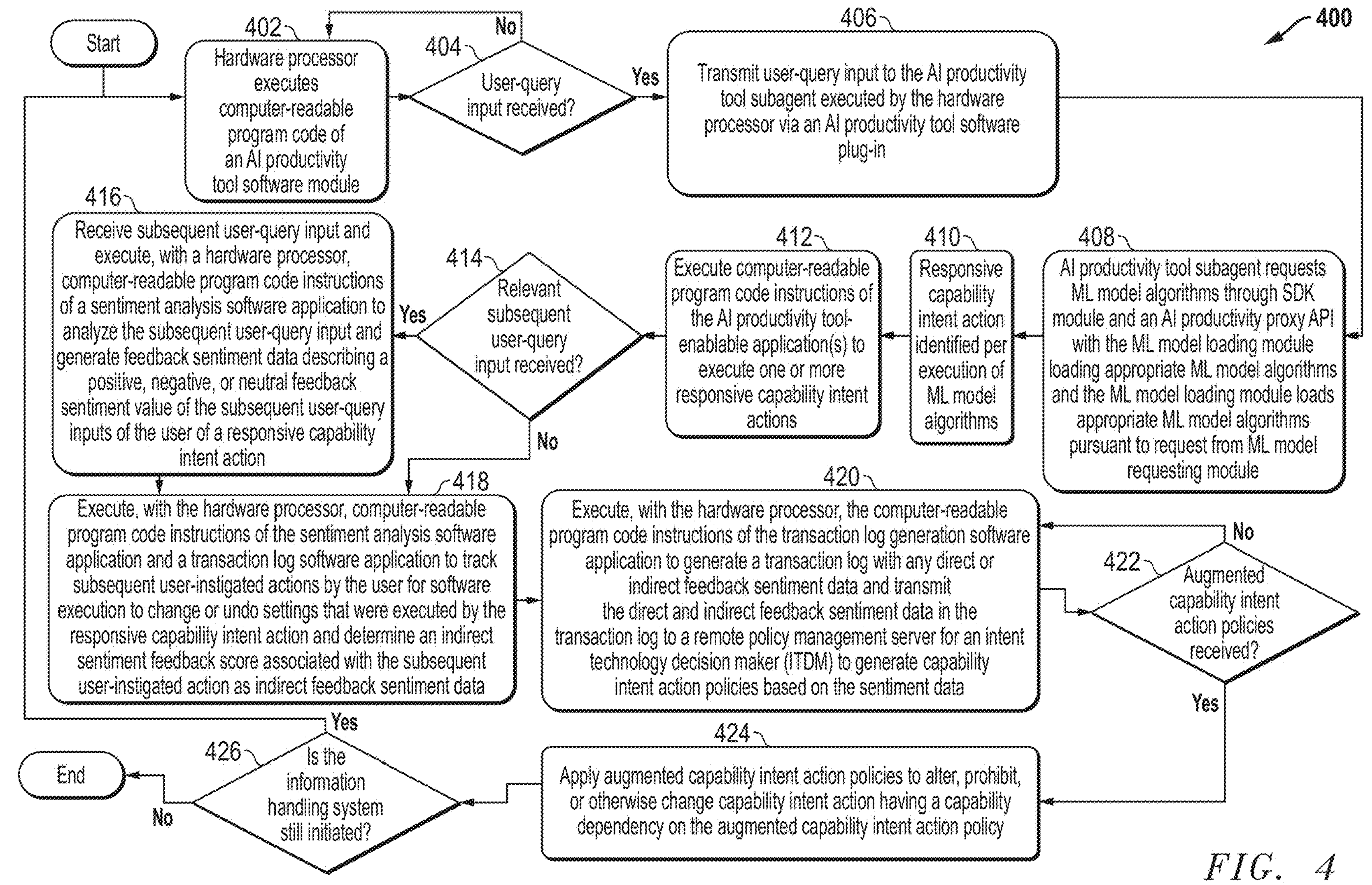
FIG. 4 is a flow diagram showing a method of executing computer-readable program code instructions of an AI productivity tool software module to identify and select responsive capabilities of a plurality of AI productivity tool-enablable software applications and to gather direct or indirect feedback sentiment data, including undo actions by a user, used to modify one or more capability intent action policies according to another embodiment of the present disclosure.

FIG. 4 is a flow diagram showing a method 400 of executing computer-readable program code instructions of an AI productivity tool software module to identify and select responsive capabilities from a plurality of AI productivity tool-enablable software applications and to gather direct or indirect feedback sentiment data, including undo actions by a user, used to modify one or more capability intent action policies according to another embodiment of the present disclosure. The method 400 described in connection with FIG. 4 may be operated on an information handling system such as an information handling system (e.g., 100, 200-1, 200-2, 200-3) described in connection with FIG. 1 or 2. In an embodiment, the information handling system may be one of a plurality of information handling systems within an enterprise. In an embodiment, an ITDM may be responsible for generating augmented capability intent action policies for application on these information handling systems within the enterprise to modify or improve operation of AI productivity tool modules thereon as described in embodiments herein.

The method 400 may include, at block 402, the hardware processor or other hardware processing device of the information handling system executing computer-readable program code instructions of an AI productivity tool software module including access to one or more AI productivity tool software applications executing on the information handling system. In an embodiment, AI productivity tool software module may be any application that can receive input from a user such as text input via the keyboard or speech input via the microphone. In some embodiments, text or audio may be received by an interface of the one or more AI productivity tool software applications and the interface managed by the AI productivity tool software module at block 402. In an embodiment, the AI productivity tool software module may include a virtual assistant-type AI software agent. In various embodiments, the hardware processor or other alternative hardware processing resources of the information handling system may execute computer-readable program code instructions of the AI productivity tool software application or AI productivity tool software module with its AI productivity tool software plug-in and monitor for user query inputs at a microphone, keyboard, or other input device for the AI productivity tool subagent to engage in capability intent actions pursuant to the user query inputs.

At block 404, the method 400 also includes determining whether any user query input has been received at the AI productivity tool software module. The AI productivity tool plug-in may monitor for input from an input/output device such as a trigger word or trigger keystroke for audio user query inputs or activation of a graphical user interface to receive text user query inputs. Where, at block 404, no user query input is received, the method 400 returns to block 402 with the AI productivity tool software module continuing to monitor for this input. Where, at block 404, the AI productivity tool software module does detect and receive user query input, the method 400 continues to block 406.

At block 406, the user query input is transmitted to a capability intent identification system such as the AI productivity tool subagent and its modules, algorithms, and software applications being executed by the hardware processor of the information handling system. In an embodiment, the AI productivity tool subagent may provide some or all of the AI productivity services as described herein.

At block 408, the method 400 continues with the AI productivity tool subagent requesting ML model algorithm through an SDK module and an AI productivity proxy API. For example, the machine learning model loading module, pursuant to the interface contract generated by the AI productivity proxy API, may load a speech-to-text model algorithm in order to, where necessary, convert any audio user query input into text or other machine-readable program code instructions for further processing by the AI productivity tool subagent. Additional ML model algorithms may be requested as well to generate query intent value for semantic meaning values assigned to the user query input as well as for conducting any semantic or lexical similarity matching with capability intent values to determine responsive capability intent value actions to the user query input in various embodiments herein. The AI productivity proxy API transmits this request for the ML model algorithms to the ML model requesting module. The ML model loading module loads the appropriate ML model algorithms pursuant to the request from the ML model requesting module.

In an embodiment, a speech-to-text model algorithm may be included among the plurality of available ML model algorithms. The speech-to-text model algorithm may, where necessary, convert any audio user query input into text or other machine-readable program code instructions for further processing by the AI productivity tool subagent. The ML model algorithms may also include a query input-to-intent ML model algorithm that receives the user query input from the speech-to-text model algorithm or directly from the AI productivity tool subagent, and, with an embedding algorithm, generates a vectorized query intent value for the user query input for later correlation with a capability intent value. Additionally, a query intent-to-capability matching ML model algorithm may receive that vectorized query intent value as input and match the vectorized query intent value to a vectorized capability intent value associated with the AI productivity tool-enablable software application via a similarity correlation algorithm to identify a capability or plurality of capabilities that can serve as one or more capability intent actions responsive to a user query input.

At block 410, the method 400 includes the capability intent action being identified via the execution of the ML model algorithms identifying the plurality of capabilities associated with one or more of the AI productivity tool-enablable software applications. In the context of the user query input received from the user (e.g., “fix audio issues in my system”) one or more of the AI productivity tool-enablable software applications may be used to execute responsive capability intent actions to adjust one or more aspects of the audio at the user’s information handling system or to update audio drivers at the information handling system. For example, the Dell® Display and Peripheral Manager® software application, the Dell® Optimizer® software application, or any other AI productivity tool-enablable software application may include a matching capability that can fix the user's audio issues via adjustments to adjust aspects of audio tone, for example bass or treble, adjust audio feed requirements or buffering, adjust volume, or other factors. For example, the Dell® Display and Peripheral Manager® software application may include a capability to update drivers associated with the peripheral device that is outputting the audio. In another example, the Dell® Optimizer® software application may include a capability that can adjust settings associated with the peripheral device that is outputting the audio. It is appreciated that any other capability associated with one or more other AI productivity tool-enablable software applications may be used to help adjust the user's audio output at a speaker (internal or external) at the user's information handling system information handling system. It is appreciated that this process may have also been carried out by other users at the other information handling system information handling systems within the enterprise of information handling system information handling systems.

Proceeding to block 412, the AI productivity tool subagent may issue an instruction for the one or more identified capabilities similarity matched as responsive capability intent actions to be executed by the corresponding AI productivity tool-enablable software application executing on the information handling system. For example, the identified capabilities semantically or lexically similarity matched to the user query input, "fix audio issues in my system" may include the AI productivity tool subagent issuing instructions to a Dell® Display and Peripheral Manager® software application to update drivers associated with the speaker that is outputting the audio. Further, in response to the user query input, "fix audio issues in my system," AI productivity tool subagent may issue instructions to execute responsive capability intent actions to the Dell® Optimizer® software application to include adjustment to audio tone, adjustment to audio feed requirements or buffering, and adjustment to volume in an example embodiment.

At block 414, execution of computer readable code instructions of the AI productivity tool software module, via the AI productivity tool plug-in or via an interface from one of the AI productivity tool-enablable software applications, determines if a subsequent user query input has been received from a user after the execution of one or more responsive capability intent actions as described above. In another embodiment, the received subsequent user query input may be determined as to whether it pertains or is relevant to the initial user query input or any executed, responsive capability intent actions to that initial user query input. The AI productivity tool subagent may invoke the query intent-to capability matching ML model algorithm in an example embodiment to determine semantic or lexical similarity matching of a subsequent query intent value to the capability intent value of one or more executed responsive capability intent actions that were responsive to the initial user query input in an embodiment. In another embodiment, the semantic similarity matching algorithm may be applied as between the subsequent user query input and the initial user query input to assess for relevance matching. Either or both may be conducted to determine if a received, subsequent user query input is relevant to the executed responsive capability intent actions. For example, the subsequent user query input, "make volume louder" may semantically or lexically match to the initial user query input of "fix audio issues in my system" as well as to executed responsive capability intent actions to adjust audio setting including volume. For example, after responsive capability intent actions above have been executed to make adjustments to audio settings or update audio drivers, a user may provide a subsequent user query input, "make volume louder." If a subsequent user query input is determined to have been received and be relevant by the AI productivity tool software module at block 414, the method may proceed to block 416. If no subsequent, relevant user query input is received at block 414, the method may proceed to block 418.

At block 416, the method 400 includes executing computer-readable program code of a sentiment analysis software application with a hardware processor to analyze the user query input and a subsequent user query input received after the execution of the responsive capability intent action or actions and generate direct feedback sentiment data describing a positive, negative, or neutral sentiment of the user query input. The sentiment analysis software application may, in an embodiment, include any computer-readable program code instructions that, when executed by a hardware processor, analyzes the user query input, responsive capability intent actions executed, and subsequent user query input or inputs and generates direct feedback sentiment data describing a positive or negative sentiment of the user in the subsequent user query input. This may be done where the sentiment analysis software application is given access to the user query input and subsequent user query inputs as they are received by the AI productivity tool subagent form the AI productivity tool software module as well as the intervening execution of one or more capability intent actions. In this embodiment, the sentiment analysis software application may be operatively coupled to the machine learning model requesting module and machine learning model loading module to have a feedback sentiment large learning model (LLM) algorithm be invoked to create direct feedback sentiment data that scores the user's sentiment in the subsequent user query input as negative, positive, or neutral. The direct feedback sentiment data may include the initial user query input, the responsive capability intent action, the subsequent user query input or inputs, and any assigned direct feedback sentiment score for those subsequent user query inputs generated by the sentiment analysis software application in embodiments herein.

For example, the feedback sentiment LLM algorithm may identify terms and phrases relating to semantic or lexical meaning intent values for emotions of the user as presented in the user query input. In an embodiment, the invocation of the feedback sentiment LLM algorithm may identify and extract subjective information from text or audio of the user query input for semantic or lexical meaning intent values such as the user's opinions, attitudes, appraisals, emotions, and the like in order based on particular words used or phrases used to determine whether the user's subsequent user query input is positive, negative, or neutral relative to the original user query input. For example, a subsequent user query input may include the phrase, "no, make volume louder, darn it!" This direct feedback sentiment data may be assigned a sentiment score value that, when one or more sentiment value thresholds has been reached, indicates whether the user's user query input is positive, negative, or neutral. Factors may include semantic meaning determination indicating a reverse correlation to a responsive capability intent action performed, such as volume louder in response to a capability intent action performed to reduce volume. Further, lexical or semantic meanings may be associated with terms "no" and "darn it" to score the subsequent user query input as more negative or less negative depending on assigned meaning values to those terms for negativity or emotion, respectively, in response to executed responsive capability intent action for an original user query input. In other examples, the subsequent user query input may include vocal inflections or other exclamations that may indicate that the user is frustrated with the audio output after execution of the responsive capability intent actions in the present example embodiment described herein. Additionally, or alternatively, the user query input may include certain inappropriate or toxic language, such as profane, vulgar, or otherwise offensive remarks. This too may indicate the frustration of the user and the execution of the feedback semantic LLM algorithm may use that subsequent user query input to determine a sentiment score for the whether the user's sentiment towards the responsive capability intent action or actions is positive, negative, or neutral. It is also appreciated that neutral words may indicate a neutral opinion, attitude, appraisal, or emotion of the user and may also be used to calculate a sentiment value to be compared to a sentiment value threshold to determine if a positive threshold, a negative threshold, or a neutral threshold has been met or exceeded.

The sentiment scoring may include assessment of the semantic meanings in the subsequent user query input in subsequent query intent values and the level their inverse correlation or inverse matching within a threshold level to capability intent values for one or more executed responsive capability intent actions. For example, the phrase, "increase volume" may be determined to fall within a threshold level of inverse correlation to a capability intent value for a capability intent action that lowers volume in response to "fix audio issues in my system." Further, terms such as "no" in the subsequent user query input may correlate by the feedback sentiment LLM algorithm with a protest against a recently executed capability intent action providing a higher score of negative sentiment. Finally, an exclamation in the subsequent user query input such as "darn it!" may further be associated with frustration by the feedback sentiment LLM algorithm further scoring the subsequent user query input as a negative sentiment such that the sentiment score falls within or above a threshold level sentiment score level for the direct feedback sentiment data. The sentiment analysis software application, therefore, may use this LLM algorithm to identify a current sentiment of the user based on the received subsequent user query input. The method may then proceed to block 418 to track any subsequent user-instigated actions or subsequent capability intent actions after execution of the responsive capability intent actions to the initial user query input.

At block 418, the method 400 further includes executing computer-readable program code of the sentiment analysis software application and a transaction log generation software application to track activity by the user via user-instigated interaction with software systems or firmware or hardware settings, or execution of capability intent actions responsive to a subsequent user query input following execution of a responsive capability intent action to an initial user query input. In example embodiments, the sentiment analysis software application may assign sentiment score values associated with the subsequent (or even previous) user-instigated actions or capability intent actions executed to change or alter an original responsive capability intent action from an initial user query input. These sentiment score values relate to assignment of negative, neutral, or positive sentiment inferred from the subsequent (or even previous) user-instigated actions or subsequent capability intent actions relative to how close those actions are to directly undoing the previously executed responsive capability intent action. For example, inverse correlation may be used between the subsequent (or even previous) user-instigated actions or capability intent actions and the original, responsive capability intent action in embodiments herein. This may come from capability intent values for the subsequent (or even previous) user-instigated actions or capability intent actions as compared to the original, responsive capability intent action.

In some embodiments, the hardware processor may execute computer readable code instructions of a semantic correlation algorithm, such as an intent-to-capability matching ML model algorithm, for inverse correlation to be used to determine an inverse correlation between a subsequent (or even previous) user-instigated actions or capability intent actions and the original, responsive capability intent action in embodiments herein. Further, one or more thresholds that may also be set, for example, to indicate a level of inverse correlation relative to a complete undo action, which serves as an inverse correlation value of one, of the original capability intent action. Such an indirect feedback sentiment score for the subsequent (or even previous) user-instigated actions or capability intent actions relative to the original, responsive capability intent action form part of the indirect feedback sentiment data in embodiments herein The indirect feedback sentiment data may further include the initial user query input, the responsive capability intent action, the subsequent (or even previous) user-instigated actions or capability intent actions, and any assigned indirect feedback sentiment score for the subsequent (or even previous) user-instigated actions or capability intent actions in embodiments herein Although specific assignments of feedback sentiment score values to this previous or subsequent capability intent actions executed by the AI productivity tool-enablable software applications may be used to determine if the feedback sentiment score values have fallen within a threshold of meeting such an inverse correlation criteria relative to an undo action, it is appreciated that any type of evaluation metric may be made that could suggest that user's subsequent (or even previous) user-instigated actions or capability intent actions have a negative or neutral indirect sentiment. A similar approach may be used with a positive correlation between the subsequent (or even previous) user-instigated actions or capability intent actions and an original capability intent action to determine a positive sentiment. The present specification also contemplates these other evaluation metrics in order to determine if the user's subsequent (or even previous) user-instigated actions or capability intent actions have positive, negative, or neutral sentiment.

At block 420, after the indirect feedback sentiment score values have been generated for the subsequent (or even previous) user-instigated actions or capability intent actions, the transaction log generation software application may generate a transaction log report including indirect and direct feedback sentiment data for transmission to an ITDM capability management network at a remote policy management server. Execution of the computer-readable program code of the transaction log generation software application generates a transaction log of the responsive capability intent action or actions executed and correlated with the initial user query input, and the indirect feedback sentiment data with the subsequent (or even previous) user-instigated actions or capability intent actions, and any assigned indirect feedback sentiment score for the subsequent (or even previous) user-instigated actions or capability intent actions generated by the sentiment analysis software application. Further, the transaction log software application may also include direct feedback sentiment data, if any, including any relevant subsequent user query input or inputs, and any assigned direct feedback sentiment score for those subsequent user query inputs generated by the sentiment analysis software application in embodiments herein.

Execution of the transaction log software application may then transmit this transaction log to a remote policy management server for an intent technology decision maker (ITDM) to generate augmented capability intent action policies based on the sentiment data. In the context of the example embodiment described herein, the ITDM may see that a threshold has been exceed in the feedback sentiment data and may alter whether, when, or how the capability intent action policies are executed at each of the information handling systems within an enterprise or on individual information handling systems. For example, the ITDM may access an ITDM capability management network in order to update, change, remove, capabilities or provide prompt recommendations to be associated with any given capability.

The ITDM may generate augmented capability intent action policies based on the direct and indirect feedback sentiment data provided with the transaction log. In the context of the example embodiment described herein, the ITDM may see that a threshold has been exceeded in the sentiment data indicating a negative sentiment from the user. The ITDM may alter how the capability intent action policies are executed at each of the information handling systems within an enterprise or on individual information handling systems in order to rectify this negative sentiment as identified by the sentiment analysis software application. For example, the ITDM may access an ITDM capability management network in order to update, change, or otherwise augment the capability policies that direct how each of the one or more AI productivity tool-enablable software applications are to execute respective capability intent actions to better address similar user query input. In the context of the example embodiment described herein, the capability policies may direct that specific settings associated with specific audio peripheral devices be changed a certain way in order to better address the user's user query input of "fix audio issues in my system." Still further, the capability policies as augmented by the ITDM (e.g., the augmented capability intent action policies) may direct that certain capabilities of the certain one or more AI productivity tool-enablable software applications not be invoked so that they cannot undo or otherwise provide no benefit to address the user's user query input of "fix audio issues in my system." Additionally, or alternatively, the ITDM may change a mapping of one of those capability intent actions associated with audio settings such that a different capability associated with an AI productivity tool-enablable software application is mapped to change those audio settings when the or similar user query input is received.

For example, execution of computer readable code instructions of the AI productivity tool software module may execute a responsive capability intent action adjusts volume and other audio settings and updates the audio drivers in response to a user query input to "fix audio issues in my system." In a subsequent user query input, a user may request "no, undo volume reduction" in a subsequent user query input or may subsequently execute a user-instigated action to adjust the volume setting up after the responsive capability intent actions are executed. Direct or indirect feedback sentiment data in a transaction log may have determined that at least one responsive capability intent action to adjust volume is associated with a negative sentiment according to the above execution of the sentiment analysis software application 298 in some embodiments. As a result, the transaction log including the subsequent user query input, subsequent user-instigated action and direct or indirect feedback sentiment data identifying the user's negative sentiment may be transmitted to the ITDM capability management network. Accordingly, an ITDM may issue an augmented capability intent action policy to change a vector capability value to the control of audio volume to map this capability intent actions via alteration of assigned capability intent values such that a lower semantic or lexical correlation to the user query input, "fix audio issues in my system" will not invoke the volume capability of an AI productivity tool-enablable software application in an embodiment. In another embodiment, the ITDM may issue an augmented capability intent action policy to change a vector capability value other audio control capability intent actions via alteration of assigned capability intent values such that a higher semantic correlation to the user query input, "fix audio issues in my system" will invoke a different capability associated with an AI productivity tool-enablable software application instead of a volume adjustment capability in other embodiments. In yet another embodiment, the ITDM may issue an augmented capability intent action policy to eliminate the vector capability value for a volume adjustment capability from a system capabilities database. In another embodiment, the ITDM may issue an augmented capability intent action policy to limit the capability associated with an AI productivity tool-enablable software application for a volume adjustment capability responsive to the user query input, "fix audio issues in my system" such that any volume adjustment is limited by a specified amount (e.g., a percentage or volume adjustment amount).

In other example embodiments, the ITDM may access an ITDM capability management network in order to update, change, or provide prompt recommendations to be associated with any given capability. In the example presented herein where the user query input was "fix audio issues in my system," the ITDM may determine in one scenario that positive criteria was presented in the sentiment data that indicated that the user's sentiment of the user query input. In this scenario, the ITDM may provide prompt recommendations to be presented to the user that describes what user query input from the user would result in a better capability intent action in the future.

At block 422, the method 400 determines whether any augmented capability intent action policies have been received from the remote policy management server described herein. Where no augmented capability intent action policies have been received, the method 400 returns back to block 420 with the information handling system waiting until the augmented capability intent action policies are received. It is appreciated that not all transmissions of the transaction logs to the ITDM capability management network via the remote policy management server may result in a response of augmented capability intent action policies. However, the information handling system may execute the computer-readable program code instructions of the transaction log generation software application and AI productivity tool subagent in order to monitor for incoming augmented capability intent action policies from the ITDM as described herein. The method may proceed from block 422 to block 426 in the event no augmented capability intent action policies are received in some embodiments, such as when the information handling system or the AI productivity tool software module are being shut down.

At block 422, where any number of augmented capability intent action policies have been received, the method 400 continues to block 424 with the information handling system executing the computer-readable program code of the AI productivity tool subagent to apply the augmented capability intent action policies in order to alter, prohibit, or otherwise change capability intent action having a capability dependency on the augmented capability intent action policy.

In an embodiment, the ITDM may, via the ITDM capability management network, have access to an enterprise capabilities and device inventory database. The enterprise capabilities and device inventory database may include information regarding the hardware, firmware, and software on each information handling system information handling system within an enterprise. The enterprise capabilities and device inventory database may also include capabilities associated with each AI productivity tool-enablable software application executable on each of the information handling systems information handling system as well as those augmented capability intent action policies associated with those capabilities. The information on the enterprise capabilities and device inventory database allows the augmented capability intent action policies to be propagated to those individual information handling system information handling systems that could benefit from the augmented capability intent action policies created by the ITDM at the ITDM capability management network.

At block 426, the method 400 further includes determining whether the information handling system is still initiated or not. Where, at block 426, the information handling system is still initiated, the method 400 continues to block 402 with the AI productivity tool software module monitoring for any additional user query input. Where the information handling system is no longer determined to be initiated at block 426, the method may end.

The systems and methods described herein, therefor, allows for augmented capability intent action policies to be propagated across one or more information handling system information handling systems based on how each user uses the AI productivity tool software application. Indeed, because each user may use different syntax or language with their individual user query input to get certain capability intent actions carried out, the system and methods described herein can address all of these different user query inputs in s similar way thereby using the sentiments of the group of users to help in the capability intent actions carried out by one or more information handling system information handling systems. It is appreciated that the systems and methods described herein may be used across all types of information handling system information handling systems operating any type of AI productivity tool software application described herein. The ITDM may more easily generate augmented capability intent action policies for a plurality of information handling system information handling systems within an enterprise so that the ITDM does not need to address the issues with every single information handling system information handling system repeatedly.

The blocks of the flow diagrams of FIG. 3 or 4 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps, or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An information handling system executing computer-readable program code instructions of an AI productivity tool software module comprising:

a hardware processor, a memory device, and a power management unit to provide power to the hardware processor and memory device;

the hardware processor to execute the computer-readable program code instructions of the AI productivity tool software module to process an initial user query input received from a user and correlate, via semantic or lexical matching, the initial user query input to a responsive capability of an AI productivity tool-enablable software application to execute a responsive capability intent action to the initial user query input;

the hardware processor to execute computer-readable program code instructions of a sentiment analysis software application to analyze a subsequent user query input received after the execution of the responsive capability intent action and determine feedback sentiment data from an inverse correlation or a positive correlation of a query intent value of the subsequent user query input to a capability intent value of the executed responsive capability intent action to determine a positive feedback sentiment score or a negative feedback sentiment score, respectively, from the subsequent user query input;

the hardware processor to execute computer-readable program code instructions of a transaction log generation software application to generate a transaction log with the feedback sentiment data including the initial query input, the responsive capability intent action, the subsequent user query input, and the positive feedback sentiment score or the negative feedback sentiment score; and the hardware processor executing computer-readable program code instructions of the transaction log generation software application to transmit the transaction log to a remote policy management server for an intent technology decision maker (ITDM) capability management network to generate augmented capability intent action policies based on the feedback sentiment data.

2. The information handling system of claim 1 further comprising:

the hardware processor executing computer-readable program code instructions of the sentiment analysis software application to analyze the subsequent user query input received after the execution of the responsive capability intent action and determine from lexical matching of words in the subsequent user query input to emotional intent values to determine the positive feedback sentiment score or the negative feedback sentiment score from the subsequent user query input.

3. The information handling system of claim 1 further comprising:

the hardware processor executing computer-readable program code instructions of the AI productivity tool software module to receive the augmented capability intent action policies from the ITDM capability management network that, based on positive criteria of the positive feedback sentiment score within the feedback sentiment data, provides recommendations to be presented to other users in an enterprise describing what user query input from the user results in a better responsive capability intent action.

4. The information handling system of claim 1 further comprising:

the hardware processor executing computer-readable program code instructions of the AI productivity tool software module to receive the augmented capability intent action policies from the ITDM capability management network that, based on negative criteria of the negative feedback sentiment score within the feedback sentiment data, removes or alters the responsive capability intent action of the AI productivity tool-enablable software application.

5. The information handling system of claim 1 further comprising:

the hardware processor to execute computer-readable program code instructions of the sentiment analysis software application to invoke, via an AI productivity tool subagent, a feedback sentiment large learning model (LLM) algorithm to use, as in-input, the subsequent user query input and analyze words therein for lexical or semantic correlation with emotional intent to generate the feedback sentiment data.

6. The information handling system of claim 1 further comprising:

the hardware processor to execute computer-readable program code instructions of the sentiment analysis software application to invoke, via an AI productivity tool subagent, a feedback sentiment large learning model (LLM) algorithm to use, as in-input, a subsequent query intent value from the subsequent user query input and conduct a semantic correlation algorithm to determine an inverse correlation with the capability intent value of the executed, responsive capability intent action to generate the feedback sentiment data.

7. The information handling system of claim 1 further comprising:

the hardware processor executing computer-readable program code instructions of the sentiment analysis software application to execute computer readable code instructions of a semantic correlation algorithm to identify an inverse correlation between a subsequent action intent value for a subsequent user-instigated action in software, firmware or hardware occurring after the responsive capability intent action and the capability intent value of the responsive capability intent action to further determine the negative feedback sentiment score in the feedback sentiment data.

8. The information handling system of claim 1 further comprising:

a system capabilities database to store capabilities associated with each of the AI productivity tool-enablable software applications.

9. The information handling system of claim 1 further comprising:

the hardware processor executing computer-readable program code instructions of an AI productivity tool subagent to invoke a query input-to-intent machine learning model algorithm to generate a vectorized query intent value for the subsequent user query input.

10. A method of executing computer-readable program code instructions of an AI productivity tool software module comprising:

executing, via a hardware processor, computer-readable program code instructions of the AI productivity tool software module to invoke a machine learning (ML) model algorithm to process an initial user query input received from a user and correlate, via semantic or lexical matching, the initial user query input to a responsive capability of an AI productivity tool-enablable software application to execute a responsive capability intent action to the initial user query input;

executing computer-readable program code instructions of a sentiment analysis software application to analyze a subsequent user query input received after the execution of the responsive capability intent action and determine feedback sentiment data including a negative feedback sentiment score from an inverse correlation of a query intent value of the subsequent user query input to a capability intent value of the executed responsive capability intent action;

executing computer-readable program code instructions of a transaction log generation software application to generate a transaction log with the feedback sentiment data including the initial query input, the responsive capability intent action, the subsequent user query input, and the negative feedback sentiment score; and transmitting, via a network interface device, the transaction log to a remote policy management server for an intent technology decision maker (ITDM) capability management network to generate augmented capability intent action policies based on the feedback sentiment data.

11. The method of claim 10 further comprising:

executing computer-readable program code instructions of the sentiment analysis software application to analyze the subsequent user query input received after the execution of the responsive capability intent action; and determining from lexical matching of words in the subsequent user query input to emotional intent values to further determine the negative feedback sentiment score from the subsequent user query input.

12. The method of claim 10 further comprising:

executing computer-readable program code instructions of the sentiment analysis software application to analyze the subsequent user query input received after the execution of the responsive capability intent action; and determining from a positive matching correlation of a query intent value of the subsequent user query input to a capability intent value of the executed responsive capability intent action, and from lexical matching of words in the subsequent user query input to emotional intent values, a positive feedback sentiment score from the subsequent user query input when the negative feedback sentiment score has not been determined for the subsequent use query input.

13. The method of claim 10 further comprising:

executing computer-readable program code instructions of the AI productivity tool software module to receive the augmented capability intent action policies from the ITDM capability management network; and based on negative criteria of the negative feedback sentiment score within the feedback sentiment data, removing or altering the responsive capability intent action of the AI productivity tool-enablable software application.

14. The method of claim 10 further comprising:

executing computer-readable program code instructions of the sentiment analysis software application to invoke, via an AI productivity tool subagent, a feedback sentiment large learning model (LLM) algorithm to use, as in-input, a subsequent query intent value from the subsequent user query input and conduct a semantic correlation algorithm to determine an inverse correlation with the capability intent value of the executed, responsive capability intent action to generate the feedback sentiment data.

15. The method of claim 10 further comprising:

executing computer-readable program code instructions of the sentiment analysis software application to execute computer readable code instructions of a semantic correlation algorithm to identify an inverse correlation between a subsequent action intent value for a subsequent user-instigated action in software, firmware or hardware occurring after the responsive capability intent action and the capability intent value of the responsive capability intent action to further determine the negative feedback sentiment score in the feedback sentiment data from the subsequent user-instigated action.

16. An information handling system executing computer-readable program code instructions of an AI productivity tool software module comprising:

a hardware processor, a memory device, and a power management unit to provide power to the hardware processor and memory device;

the hardware processor to execute the computer-readable program code instructions of the AI productivity tool software module to invoke a machine learning (ML) model algorithm to process an initial user query input received from a user and correlate, via semantic or lexical matching, the initial user query input to a responsive capability of an AI productivity tool-enablable software application to execute a responsive capability intent action to the initial user query input;

the hardware processor to execute computer-readable program code instructions of a sentiment analysis software application to execute computer readable code instructions of a semantic correlation algorithm to identify an inverse correlation between a subsequent action intent value for a subsequent user-instigated action in software, firmware or hardware and a capability intent value of the responsive capability intent action to determine a negative feedback sentiment score for the subsequent user-instigated action for feedback sentiment data;

the hardware processor to execute computer-readable program code instructions of a transaction log generation software application to generate a transaction log with the feedback sentiment data including the initial query input, the responsive capability intent action, the subsequent user-instigated action, and the negative feedback sentiment score; and the hardware processor executing computer-readable program code instructions of the transaction log generation software application to transmit the transaction log to a remote policy management server for an intent technology decision maker (ITDM) capability management network to generate augmented capability intent action policies based on the feedback sentiment data.

17. The information handling system of claim 16 further comprising:

the hardware processor to execute computer-readable program code instructions of the sentiment analysis software application to analyze a subsequent user query input received after the execution of the responsive capability intent action and further determine in the feedback sentiment data the negative feedback sentiment score from an inverse correlation of a query intent value of the subsequent user query input to the capability intent value of the executed responsive capability intent action.

18. The information handling system of claim 16 further comprising:

the hardware processor executing computer-readable program code instructions of the sentiment analysis software application to analyze a subsequent user query input received after the execution of the responsive capability intent action and determine from lexical matching of words in the subsequent user query input to emotional intent values to further determine the negative feedback sentiment score in the feedback sentiment data from the subsequent user query input.

19. The information handling system of claim 16 further comprising:

the hardware processor executing computer-readable program code instructions of the AI productivity tool software module to receive the augmented capability intent action policies from the ITDM capability management network that, based on negative criteria of the negative feedback sentiment score within the feedback sentiment data, removes or alters the responsive capability intent action of the AI productivity tool-enablable software application.

20. The information handling system of claim 16 further comprising:

the hardware processor to execute computer-readable program code instructions of the sentiment analysis software application to invoke, via an AI productivity tool subagent, a feedback sentiment large learning model (LLM) algorithm to use, as input, the subsequent action intent value from the user instigated action query input and conduct a semantic correlation algorithm to determine an inverse correlation with the capability intent value of the executed, responsive capability intent action to generate the feedback sentiment data.

* * * * *